(12) United States Patent
Aller

(10) Patent No.: US 8,422,777 B2
(45) Date of Patent: Apr. 16, 2013

(54) TARGET AND METHOD OF DETECTING, IDENTIFYING, AND DETERMINING 3-D POSE OF THE TARGET

(76) Inventor: Joshua Victor Aller, Portland, OR (US)

( * ) Notice: Subject to any disclaimer, the term of this patent is extended or adjusted under 35 U.S.C. 154(b) by 775 days.

(21) Appl. No.: 12/578,543

(22) Filed: Oct. 13, 2009

(65) Prior Publication Data

US 2010/0092079 A1    Apr. 15, 2010

Related U.S. Application Data

(60) Provisional application No. 61/105,045, filed on Oct. 14, 2008, provisional application No. 61/228,129, filed on Jul. 23, 2009.

(51) Int. Cl.
   *G06K 9/00* (2006.01)
   *G06K 9/34* (2006.01)

(52) U.S. Cl.
   USPC .......................................................... 382/165

(58) Field of Classification Search .................. 382/162, 382/164, 165, 168, 172, 270–271; 345/419; 358/465, 466, 515
   See application file for complete search history.

(56) References Cited

U.S. PATENT DOCUMENTS

| | | | |
|---|---|---|---|
| 4,649,504 A | 3/1987 | Krouglicof | |
| 4,745,269 A | 5/1988 | Van Gils | |
| 4,896,029 A | 1/1990 | Chandler | |
| 5,124,536 A | 6/1992 | Priddy | |
| 5,241,166 A | 8/1993 | Chandler | |
| 5,260,556 A | 11/1993 | Lake | |
| 5,396,331 A | 3/1995 | Kitoh | |
| 5,521,843 A | 5/1996 | Hashima | |
| 5,554,841 A | 9/1996 | Kost | |
| 5,591,956 A | 1/1997 | Longacre | |
| 5,612,524 A | 3/1997 | Santanselmo | |
| 5,637,849 A | 6/1997 | Wang | |
| 5,726,435 A | 3/1998 | Hara | |
| 5,781,658 A * | 7/1998 | O'Gorman | 382/172 |
| 5,805,289 A | 9/1998 | Corby, Jr. | |
| 5,828,770 A | 10/1998 | Leis | |
| 5,832,139 A | 11/1998 | Batterman | |
| 5,850,469 A | 12/1998 | Martin | |
| 6,017,125 A | 1/2000 | Vann | |
| 6,273,336 B1 | 8/2001 | Rudeen et. al. | |
| 6,330,356 B1 | 12/2001 | Sundareswaran | |
| 6,424,734 B1 | 7/2002 | Roberts | |
| 6,556,722 B1 | 4/2003 | Russell | |

(Continued)

FOREIGN PATENT DOCUMENTS

WO    2010045271    4/2010

OTHER PUBLICATIONS

International Bureau of WIPO; International Preliminary Report on Patentability; PCT/US2009/060564; Apr. 28, 2011; 7 pages.

(Continued)

*Primary Examiner* — Amir Alavi
(74) *Attorney, Agent, or Firm* — Stolowitz Ford Cowger LLP

(57) ABSTRACT

We disclose a photogrammetry target that includes a background having a first color and a plurality of ovoid regions located on the background and having a second color contrasting the first color. We further disclose a method and system for detecting the target and processing image data captured from the target to discern therefrom at least one of a distance to the target, identification of the target, or pose of the target.

20 Claims, 29 Drawing Sheets

U.S. PATENT DOCUMENTS

| | | |
|---|---|---|
| 6,650,764 B1 | 11/2003 | Wakashiro |
| 6,724,930 B1 | 4/2004 | Kosaka |
| 6,771,808 B1 | 8/2004 | Wallack |
| 6,985,620 B2 | 1/2006 | Sawhney |
| 6,990,215 B1 | 1/2006 | Brown |
| 7,025,279 B2 | 4/2006 | Walmsley |
| 7,231,063 B2 | 6/2007 | Naimark et al. |
| 7,287,706 B2 | 10/2007 | Walmsley |
| 7,298,889 B2 | 11/2007 | Massen |
| 7,398,928 B2 | 7/2008 | Gaspard |
| 2004/0028258 A1 | 2/2004 | Naimark et al. |
| 2004/0129901 A1 | 7/2004 | Yamaguchi et al. |
| 2005/0285761 A1 | 12/2005 | Jancke |
| 2006/0269124 A1 | 11/2006 | Harada |
| 2007/0008310 A1* | 1/2007 | Hahn et al. .......... 345/419 |
| 2007/0098234 A1 | 5/2007 | Fiala |
| 2007/0153297 A1 | 7/2007 | Lau |
| 2010/0092079 A1* | 4/2010 | Aller .......... 382/165 |

OTHER PUBLICATIONS

Kato et al.; Marker Tracking and HMD Calibration for a Video-Based Augmented Reality Conferencing System; Proceedings of the 2nd International Workshop on Augmented Reality (IWAR 99); Oct. 1999; 10 pages.

Gandy et al.; Prototyping Applications with Tangible User Interfaces in DART, The Designer's Augmented Reality Toolkit; Positional paper at Toolkit Support for Interaction in the Physical World Workshop at IEEE Pervasive Computer 2004; Apr. 20, 2004; 2 Pages.

United States Patent and Trademark Office/ISA; International Search Report and Written Opinion PCT/US09/60564, filed Oct. 13, 2009; mailing date Dec. 10, 2009; 8 Pages.

* cited by examiner

TARGET AND METHOD OF DETECTING, IDENTIFYING, AND DETERMINING 3-D POSE OF THE TARGET

RELATED APPLICATIONS

This application claims priority to U.S. provisional application 61/105,045, filed Oct. 14, 2008, titled, "MULTIPART TARGET DESIGN AND METHOD TO DETECT, IDENTIFY, AND DETERMINE FULL ATTITUDE 3-D POSE OF SAID TARGET," and to U.S. provisional application 61/228,129, filed Jul. 23, 2009, titled, "COMPACT VISUAL LOCATING MARKER, AND METHOD TO DETECT, IDENTIFY, AND DETERMINE 3-D POSE OF SAID MARKER," both of which we incorporate by reference in their entirety.

COPYRIGHT

The copyright owner has no objection to the facsimile reproduction by anyone of the patent document or the patent disclosure, as it appears in the U.S. Patent and Trademark Office patent file or records, but otherwise reserves all copyright rights whatsoever. 37 CFR §1.71(d).

FIELD

The described system relates to targets and methods of detecting and identifying targets. More specifically, the described system relates to the fields of photogrammetry, augmented reality, and fiducial markers.

BACKGROUND

The computers, mobile devices, and cellular phones that we use every day are equipped with camera devices that record observations of the physical world. Lacking the power of human-like cognition however, these devices cannot quickly or reliably recognize ordinary objects or physical locations. To aid computing devices, a number of artificial patterns or visual data coding schemes have been introduced into our physical world. These patterns are called targets, markers, labels, and the like. These terms will be used interchangeably in this document.

A target that encodes data is called a fiducial marker. The most widespread fiducial marker is the 1-D bar code. When applied to an object, the bar code allows a computer to identify the object, and this information can be used to look up a price, track inventory, or bring up any appropriate information on the computer screen. We use the terms target and marker intermittently throughout the description.

While bar codes are designed to be detected by special coherent light scanners, many other fiducial markers have been developed based on 2-D patterns detectable by high-resolution Charged Coupled Device (CCD) cameras. Fiducials such as Data Matrix, utilized by the U.S. Postal Service and Maxicode, which is used by United Parcel Service, are commonly used for mail and package sorting. Another fiducial, Quick Response (QR) code, has been widely adopted for use in commercial tracking and has had recent popular appeal for mobile information tagging. These markers are designed to encode thousands of bits of information with data redundancy in a form that can be read by a CCD camera.

While fiducial markers are primarily concerned with encoding data, a related class of targets, augmented reality markers, are designed to encode identifying information and convey a 3-D position. These markers are designed to encode less data but be more recognizable in low-resolution images.

Yet another class of visual targets, photogrammetry targets, has been developed to derive precise positioning and measurement from images. Applications of the use of identifiable targets in photogrammetry include lens modeling and calibration, precise measurement, and optical positioning systems. In these applications, it is necessary to identify and precisely locate within a 2-D raster image the projection of identifiable targets placed in physical 3-D space.

Photogrammetry targets can be located within a 2-D image to a sub-pixel resolution. It is well known in the art that circular targets can very accurately locate points within an image, because circles project to near ellipses when viewed at any angle, even with distorted lenses, and the centers of these ellipses can be detected despite variations in light exposure level, contrast, and image blur. Coded photogrammetry targets convey an identifying code as well as precise positioning.

Photogrammetry targets exist in a few varieties:
1. Uncoded targets that convey position but not identification, e.g., a uniform circular dot.
2. Coded Photogrammetry targets that convey a precise location and identification data for the point.
3. Fixtures and scale bars that are precisely machined 3-D structures containing multiple locatable positions.
4. Photogrammetry target sheets containing multiple circular dots on a 2-D surface arranged in a configuration that is recognizable in an image after projection.

Motivation for an Improved Target Design

Applications of the existing target systems have been primarily for industrial and special purpose computer systems, in environments of controlled viewing angles and controlled lighting, and utilizing cameras with high quality lenses and high-resolution sensors.

There exists a need now, however, for the general ability to detect and precisely locate targets from mobile devices such as PDAs, cell phones, smart phones, and other devices not necessarily equipped with high quality lenses and high-resolution sensors. While these devices are programmable, they contain very limited, low cost camera systems. These cameras typically have poor quality fixed focus optics, low resolution sensors, and are often used in naturally lit and poorly lit environments.

In applications of fiducial tag reading, augmented reality, and photogrammetry, it is necessary that targets be identified at a wide range of viewing angles, and at a long range. Given the low resolution of mobile device cameras, this ability is limited primarily by the size of the target. What is needed is a target that can be identified and precisely located when occupying a minimum number of pixels in a poor quality captured image.

When observing patterns occupying only a few pixels, the distorting effects of low cost cameras on the image signal can be significant, and these effects must be mitigated to reliably detect and locate a compact pattern.

Deficiencies of the Existing Systems

The locating and identifying mechanisms of existing target designs are not suited for low-resolution, blurry, or distorted images. Because of many image distortions object shapes may be altered, boundary edges shift, and sharp corners become rounded. Low cost lens distortion can also cause straight lines to appear bent, and assumptions about projection to be inaccurate.

A number of methods utilize square corner detection, as this is easily accomplished with image processing techniques. These corner-based methods suffer from distortions to the image that happen as a result of exposure level, contrast, and image blur, ultimately making square corners a poor choice for determining an exact location. Squares are also difficult to recognize at a low resolution if an image becomes excessively blurred, as sharp features all tend to be rounded by the optical system, demosaicing, and image compression. Using the inaccurate corner positions causes any derived 3-D pose (full 3-D position and orientation) to be inaccurate as well.

Several existing targets surround a circular dot with coding information that allows it to be identified. Though able to convey a highly accurate position, these methods all suffer from the drawback that the identifying features require significantly more image area than the locating dot. The boundary shift effect can also make it difficult to locate the identifying features of many of these targets because the central dot may appear arbitrarily scaled.

Some systems use concentric features such as concentric circular rings and squares. The symmetry of these shapes can be easily detected and they convey a more reliable scale. However, these concentric features demand a significant amount of surface area without conveying a full 3-D pose.

Most existing targets use separate geometric features for conveying target location (or 3-D pose), and data encoding. The locating features are not able to encode any additional information (for example identification, coding scheme, or printed target scale).

Some methods determine pose based on oversimplified lens projection models. Some methods are able to estimate a 3-D pose but are not able to produce a metric for the reliability of that pose (for example, reprojection error).

Some targets produce only one high precision location, thus multiple coded targets are required to recognize a pose in three dimensions. This requires significantly more target area. Often these targets must be surveyed to find their locations relative to each other in 3-D space before they can be used to determine camera location.

Some targets arrange features such as dots or crosses in patterns such as lines, L's, or grids, as these patterns can be easily detected. Though able to convey multiple high accuracy locations, they require a significant number of dots, and they must be complex enough so they will not be confused with naturally occurring background patterns.

Other systems require three-dimensional targets to be constructed, or a precisely machined fixture to be utilized. These targets are simply too expensive and delicate for widespread use.

Yet other systems require use of specialized camera systems, laser, or optical systems. These systems are much more expensive than those that utilize low cost CCD cameras and are generally useful only in highly controlled environments.

The deficiencies of existing targets and locating systems can be summed us as follows:
a) Existing targets take up significant image area to encode identification while often locating only one high accuracy location.
b) Existing targets are not recognizable at extreme angles, or in low resolution or degraded images.
c) Most geometric features (and image area) of existing targets are not used for locating a position, but only for identification of the target.
d) Some systems require precisely machined three-dimensional targets.
e) Some systems require many targets to be surveyed before they can convey a 3-D pose.
f) Existing targets fail to compactly convey an accurate 3-D pose.

BRIEF DRAWINGS DESCRIPTION

FIGS. 6A, 6B, 6C, and 6D are illustrations of the boundary shift effect on a theoretical 1-D signal.

Figure 7:
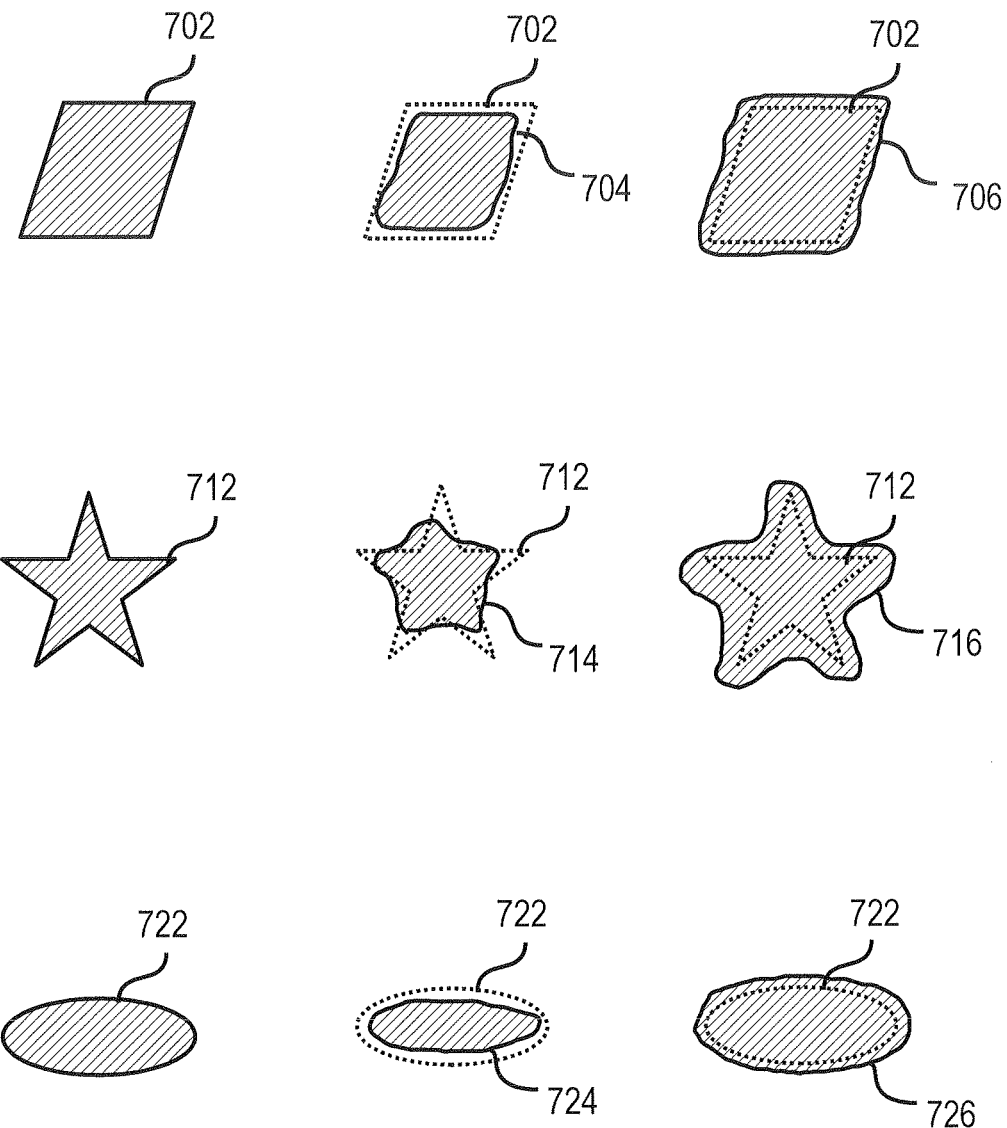

FIG. 7 is an illustration of a typical boundary effect on three 2-D shapes.

Figure 8:
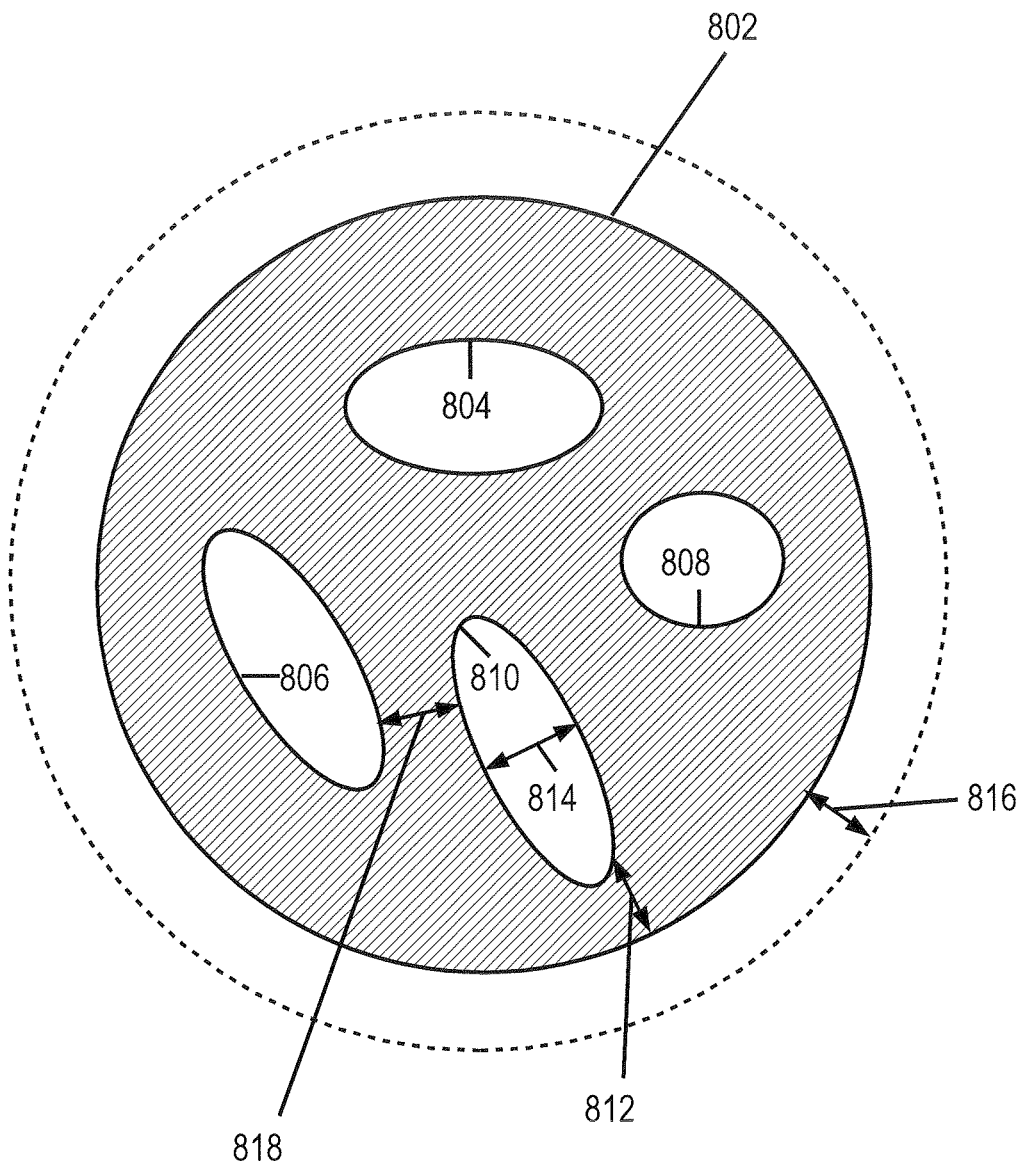

FIG. 8 is an illustration of a target and some key features of the target design.

Figure 9:
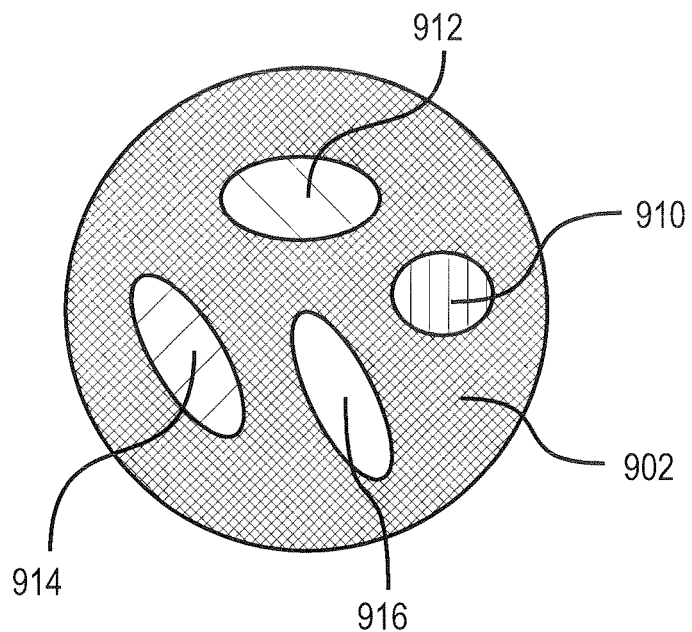

FIG. 9 is an illustration of a means of encoding color into a target.

Figure 10:
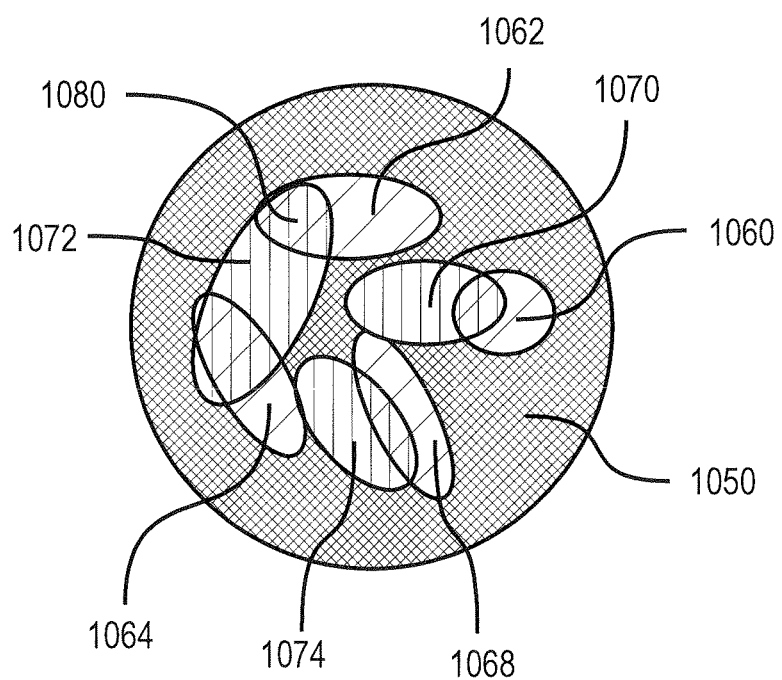

FIG. 10 is an illustration of another means of encoding color into a target.

Figure 11:

FIG. 11 is an illustration of a target with inverted intensity.

Figure 12:
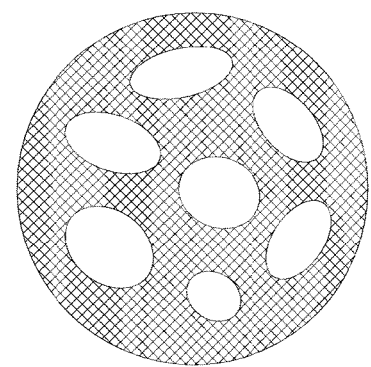

FIG. 12 is an illustration of a target with a number of foreground figures.

Figure 13:
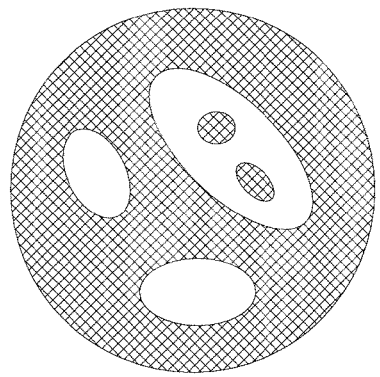

FIG. 13 is an illustration of a target with figures containing other figures.

Figure 14:
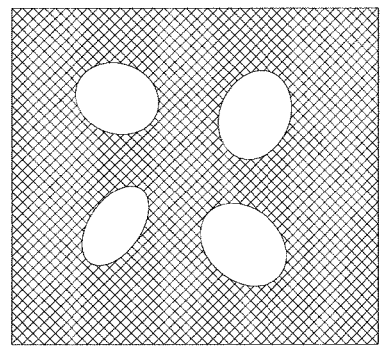

FIG. 14 is an illustration of a target with a square background shape.

Figure 15:
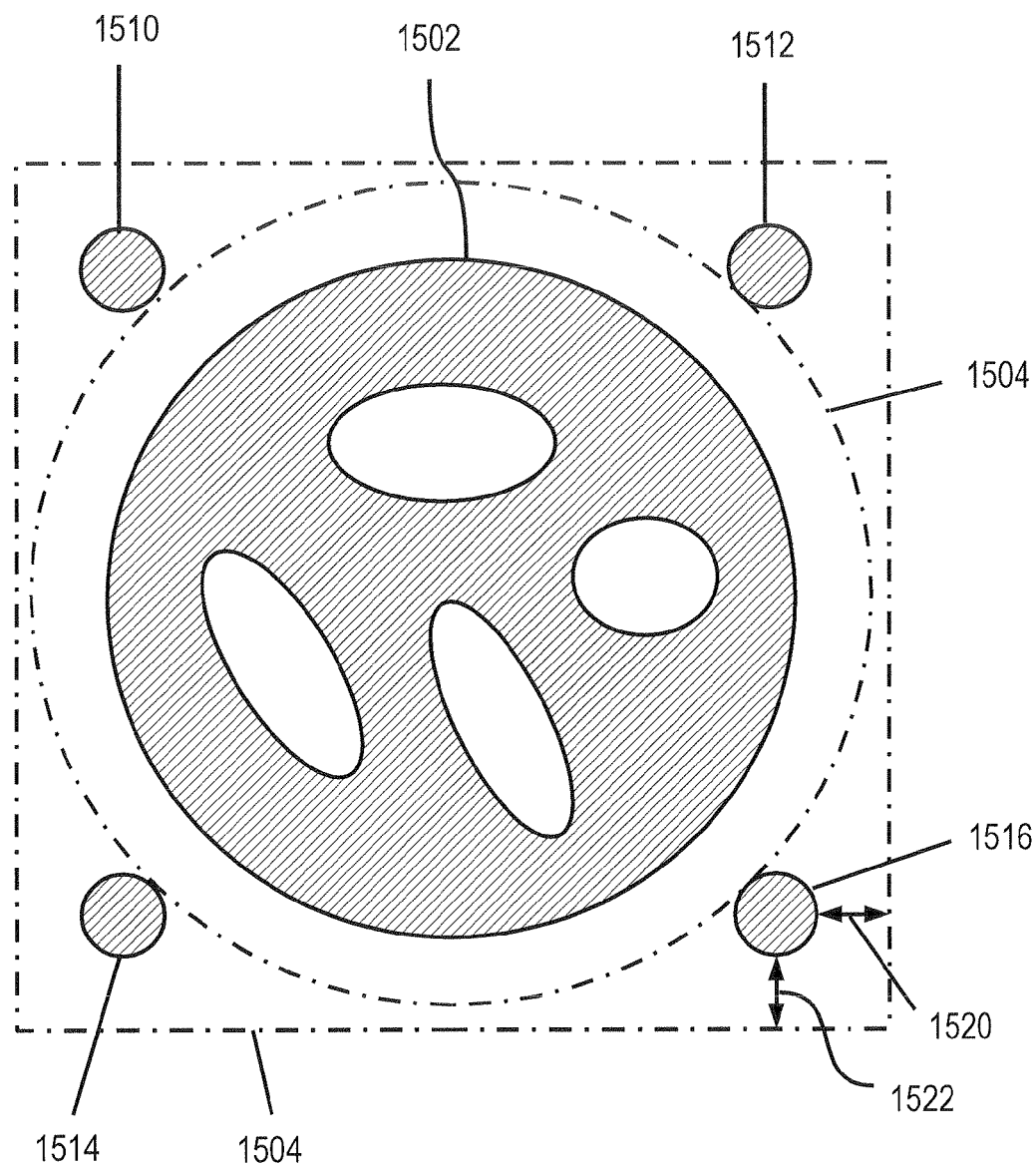

FIG. 15 is an illustration of another means of using color in a target.

Figure 16:
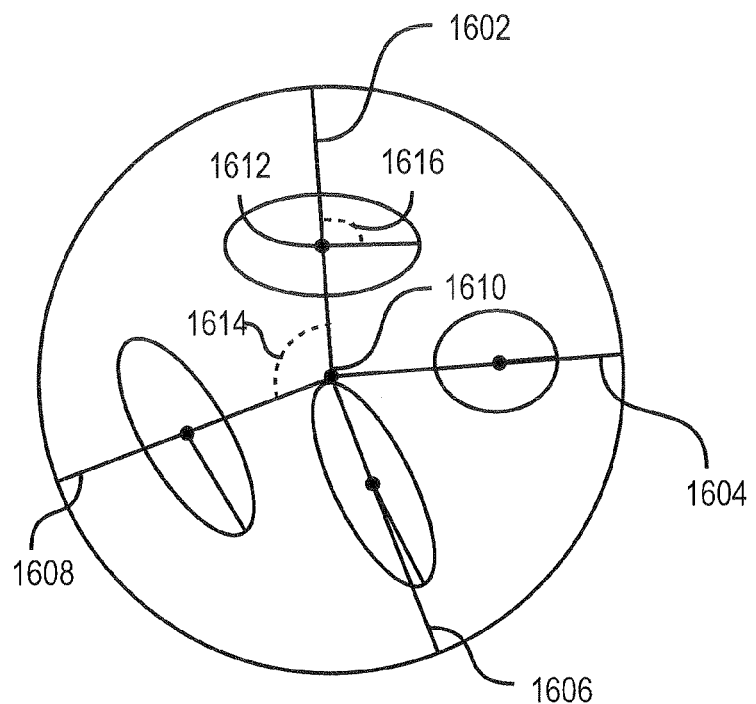

FIG. 16 is an illustration of construction spokes used to determine metrics.

Figure 17A:
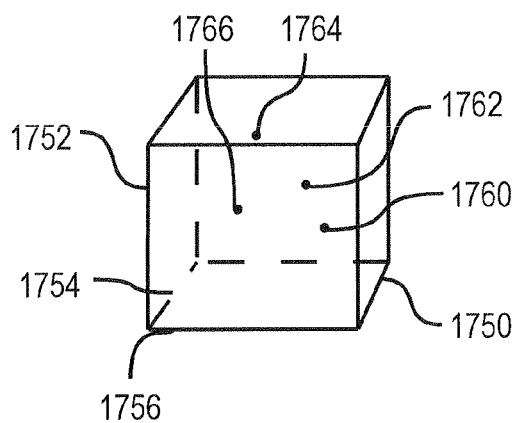
Figure 17B:
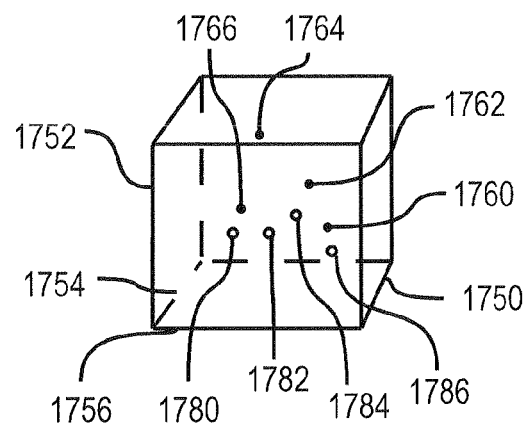

FIGS. 17A and 17B are illustrations of a target represented in metrics space.

Figure 18:
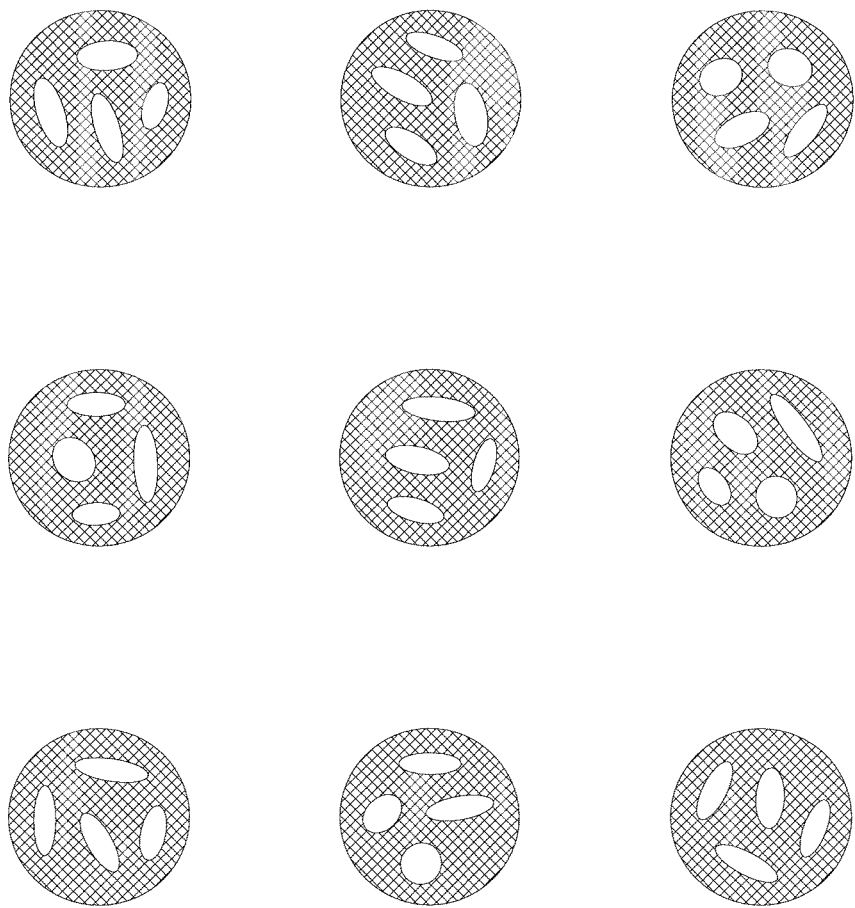

FIG. 18 is an illustration of a set of targets contained in a target library.

Figure 19:
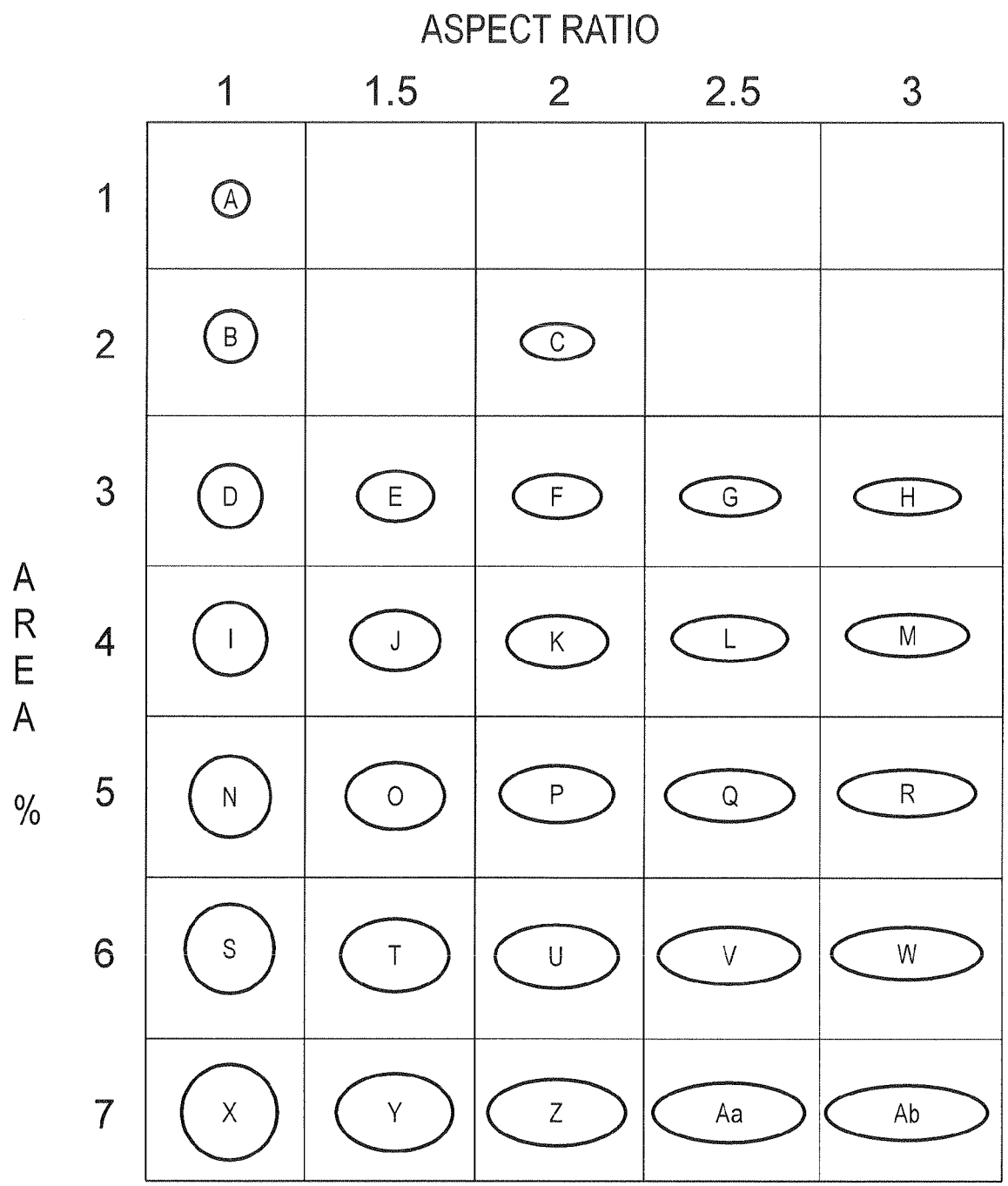

FIG. 19 is an illustration of a fixed palette of foreground figures.

Figure 20A:
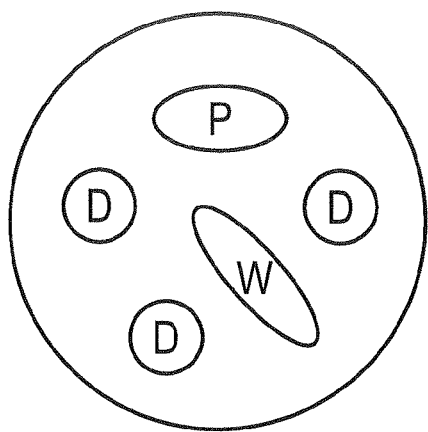
Figure 20B:
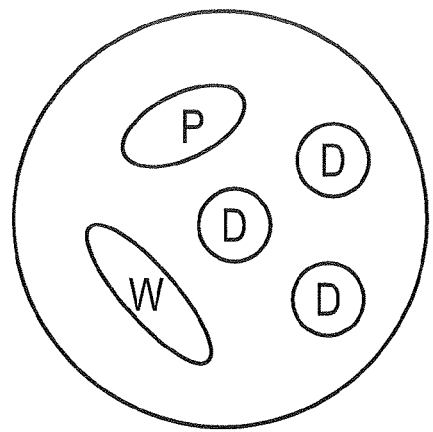

FIGS. 20A and 20B are illustrations of two different layouts of the same foreground figures.

Figure 21:
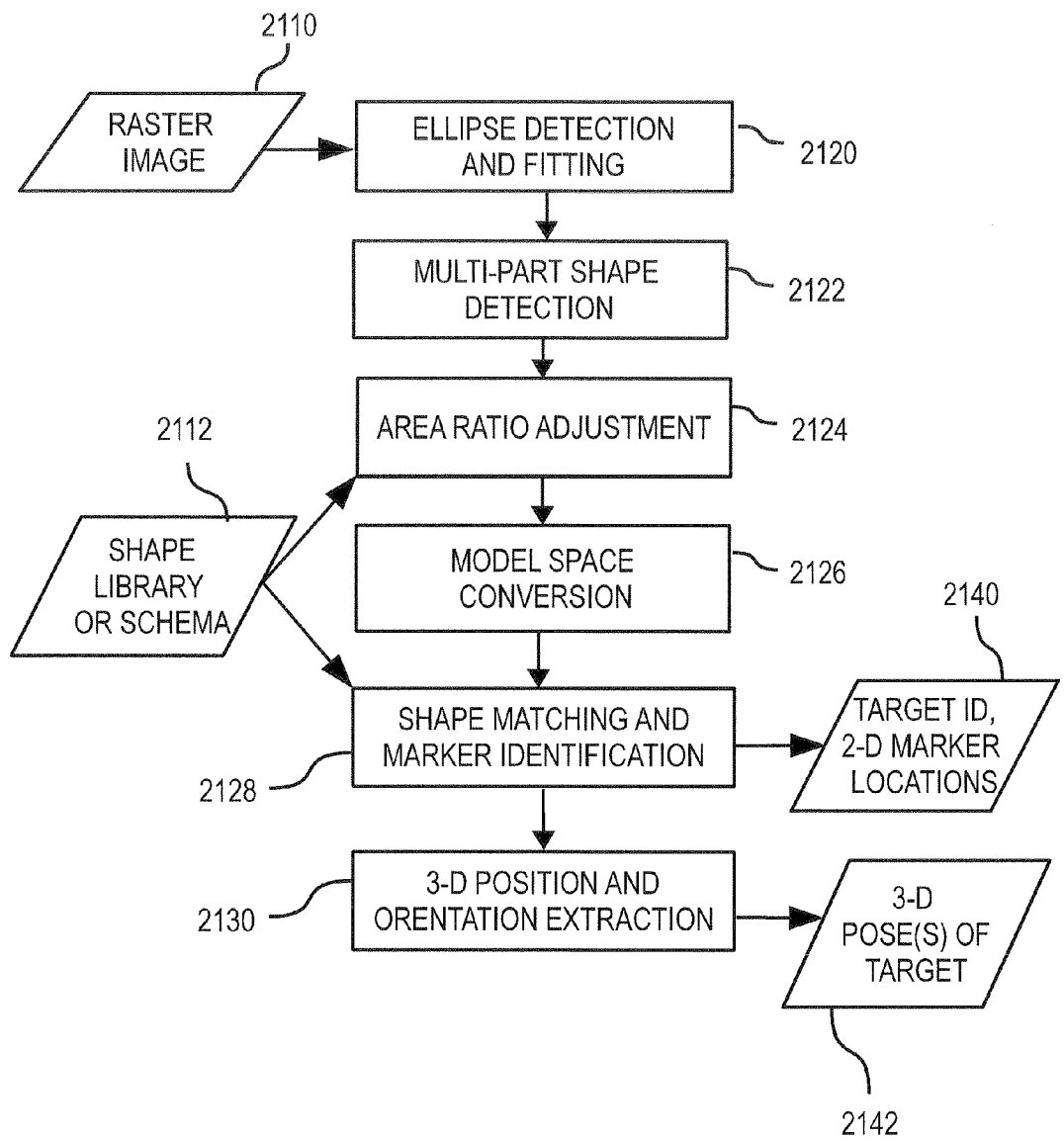

FIG. 21 is a block diagram of a target detection method.

FIGS. 22A, 22B, 22C, 22D, 22E and 22F are illustrations of data in various stages of detection.

Figure 23:
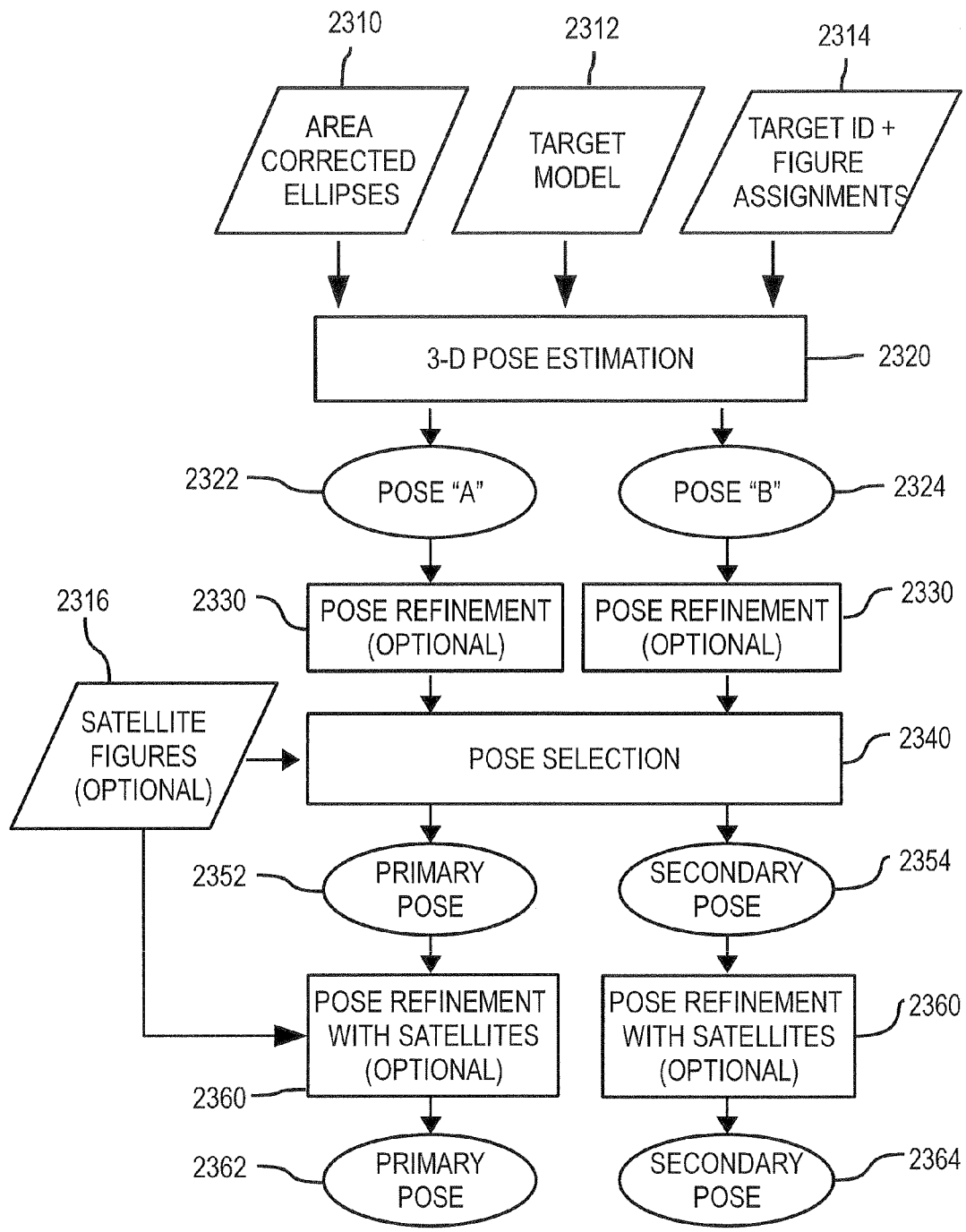

FIG. 23 is a block diagram of the 3-D pose determination.

Figure 24:
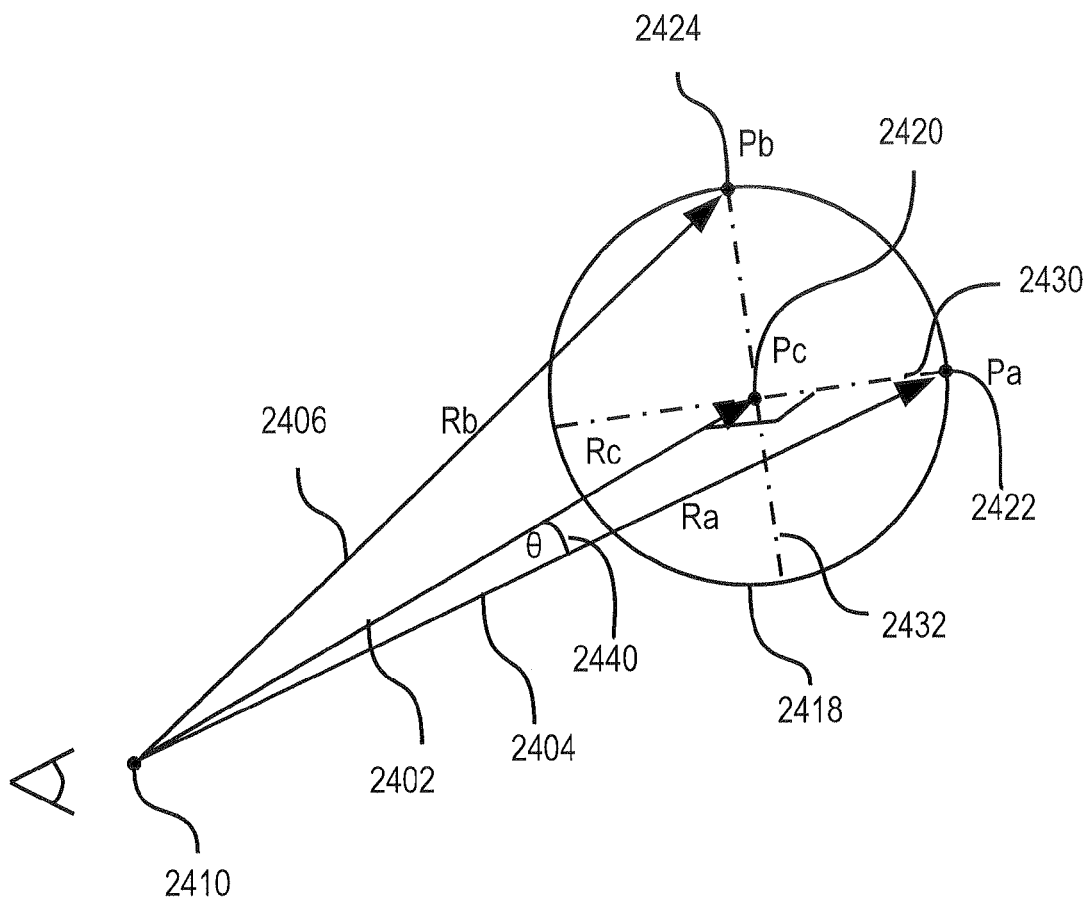

FIG. 24 is an illustration of geometric features used to estimate pose.

FIGS. 25A, 25B, 25C, 25D, 25E, and 25F are illustrations of an ellipse detection method.

Figure 26:
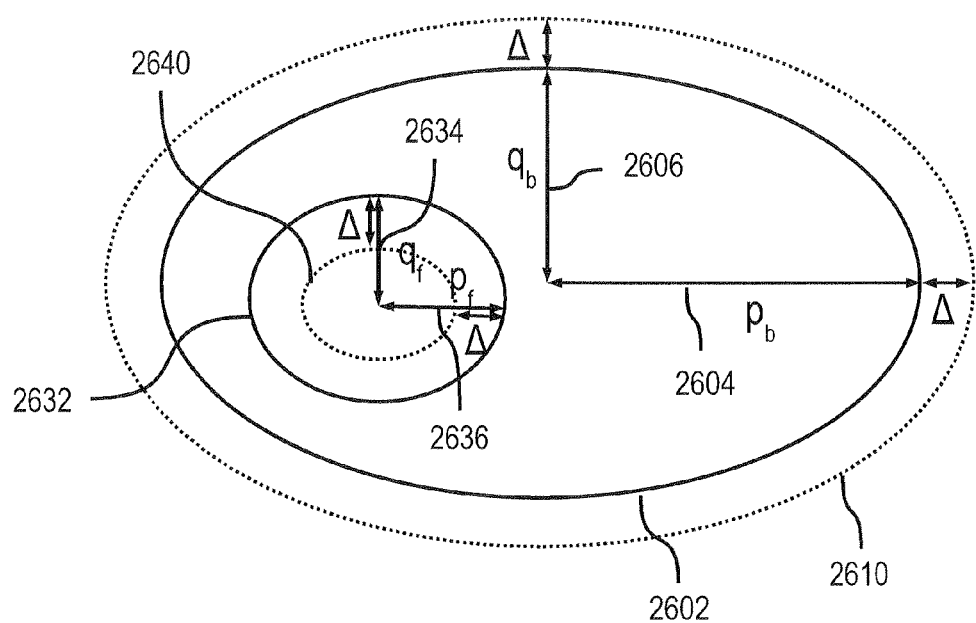

FIG. 26 is an illustration of boundary shift on a detected target.

Figure 27:
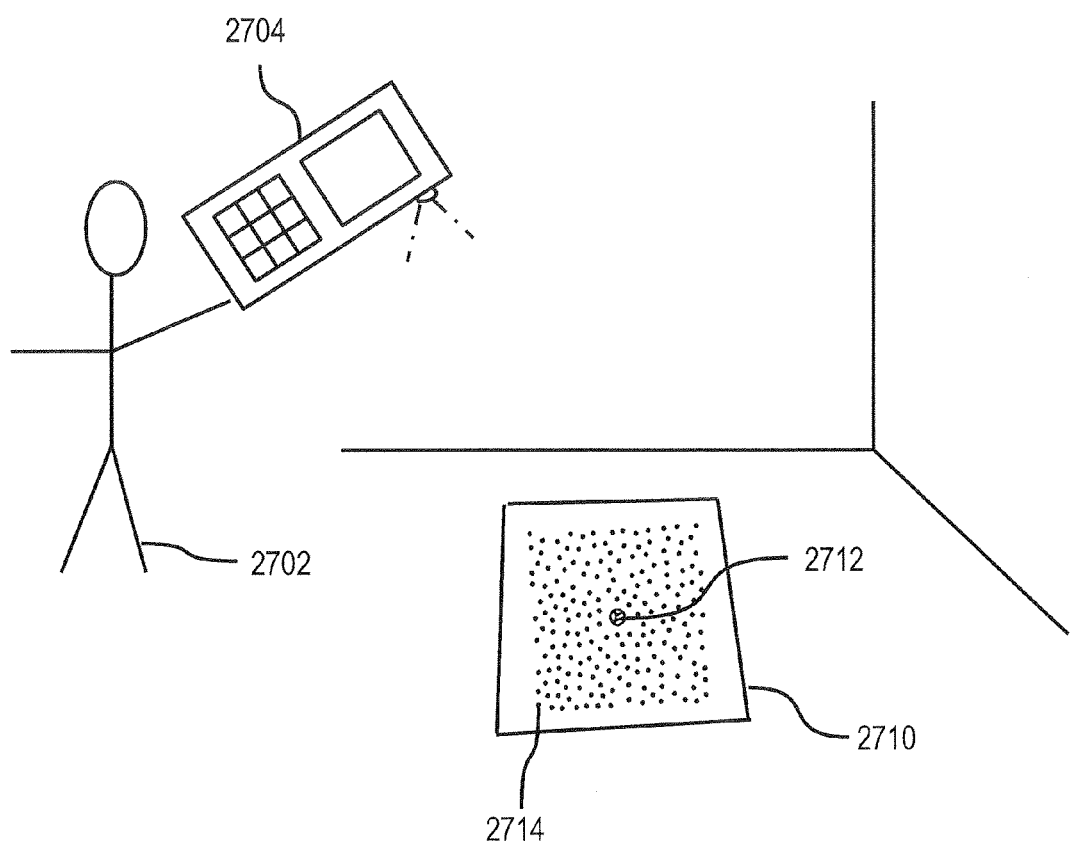

FIG. 27 is an illustration of a camera calibration method.

Figure 28:
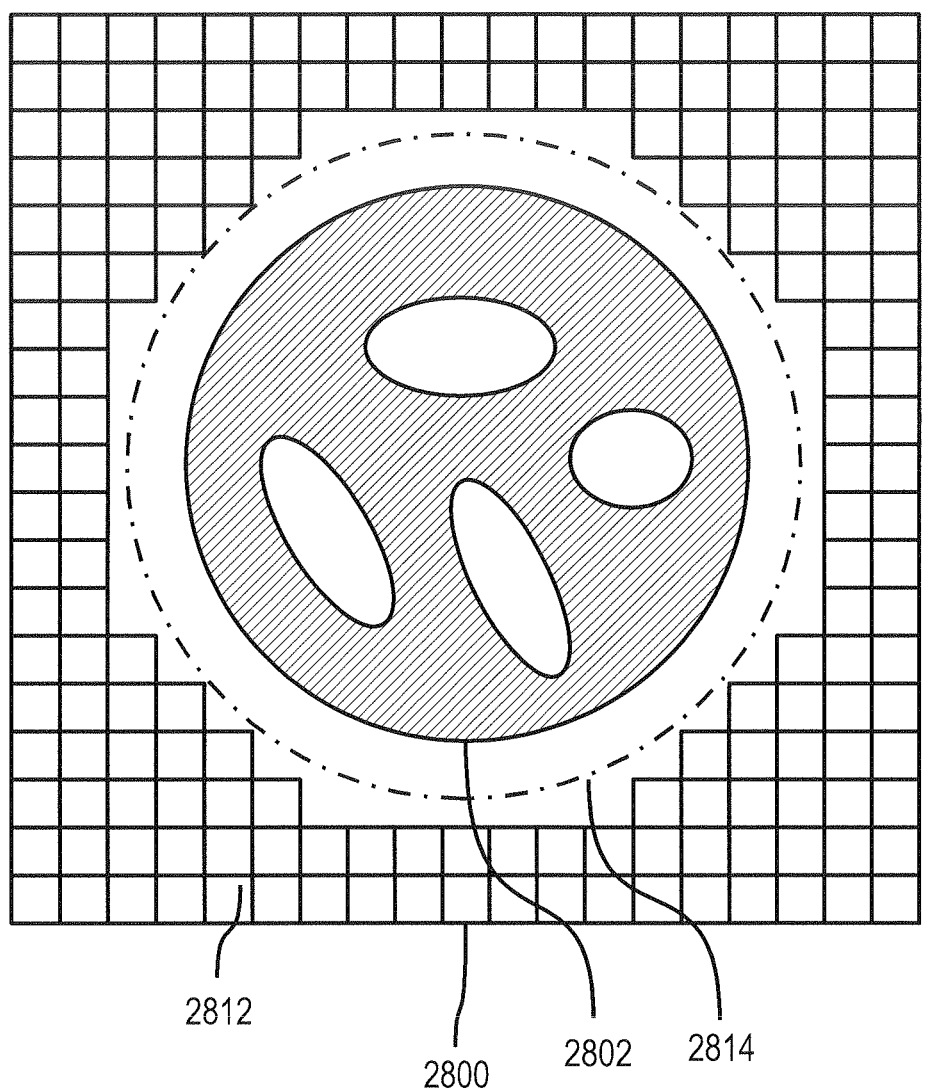

FIG. 28 is an illustration of a fiducial design using a target as a locating device.

Figure 29:
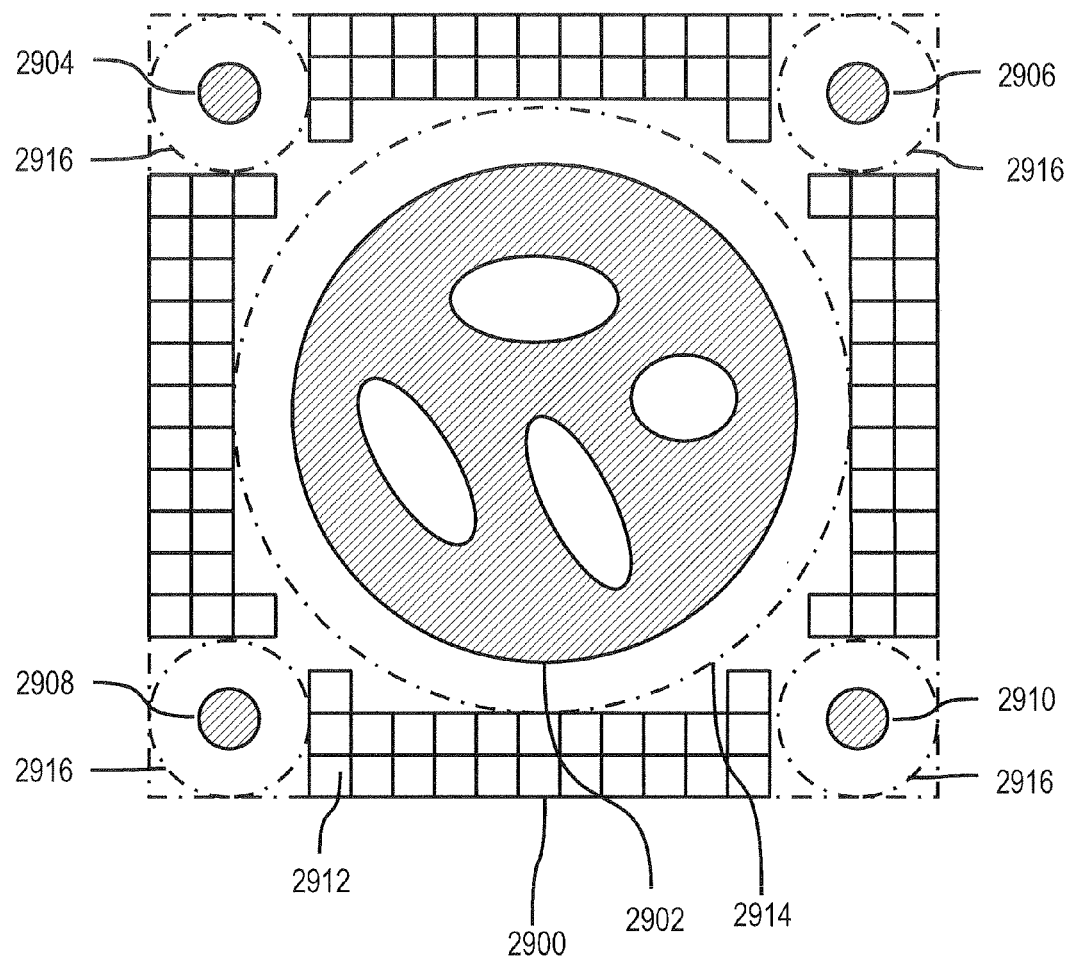

FIG. 29 is an illustration of a fiducial design employing satellite figures.

Figure 30:
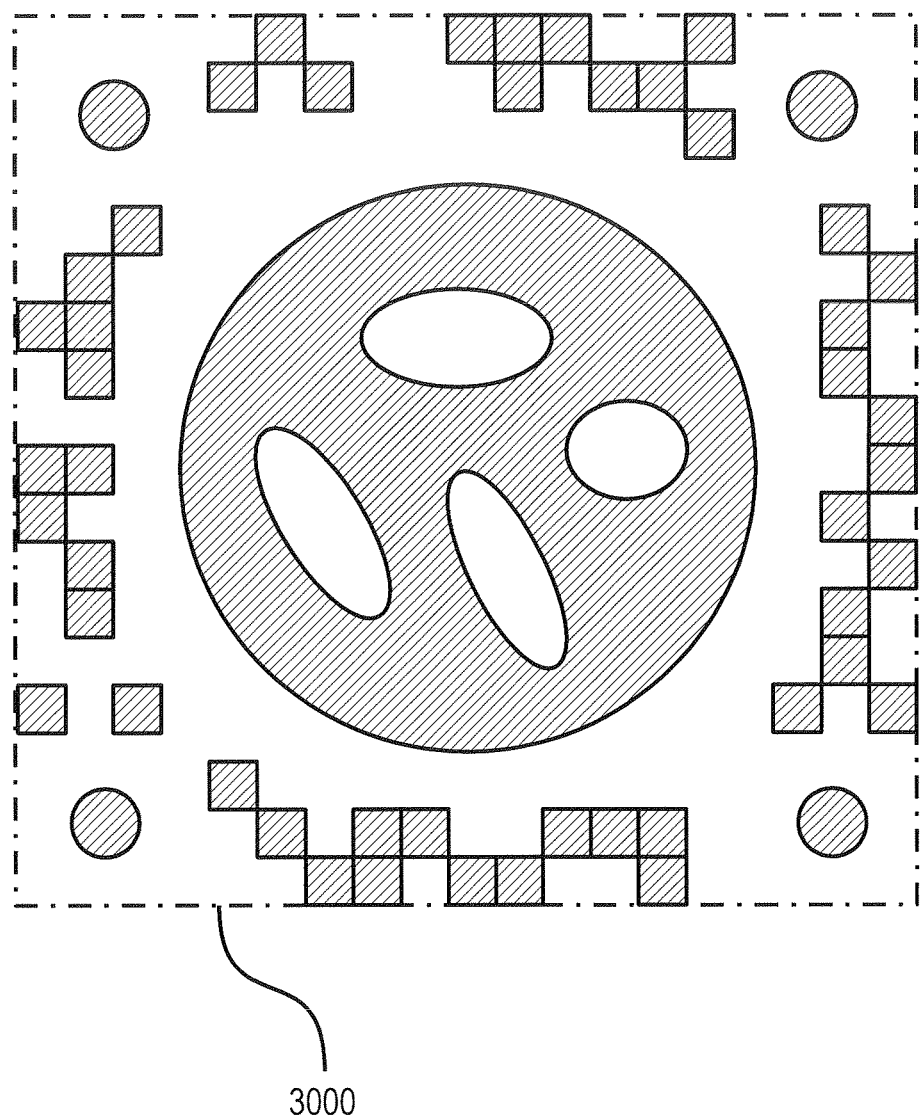

FIG. 30 is an illustration of a sample code generated with a fiducial scheme.

Figure 31:
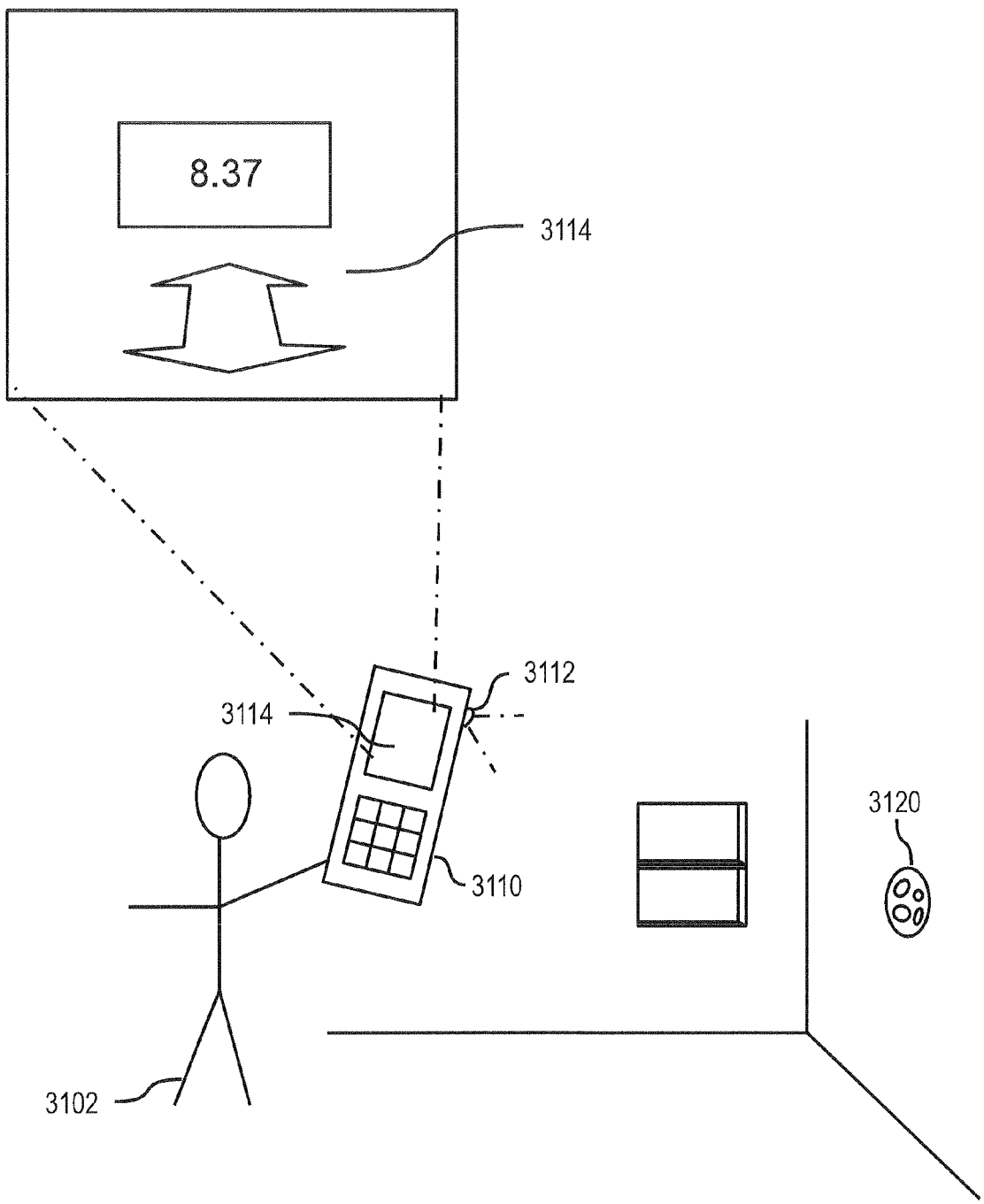

FIG. 31 is an illustration of a use of the targets in a mobile measuring application.

Figure 32:
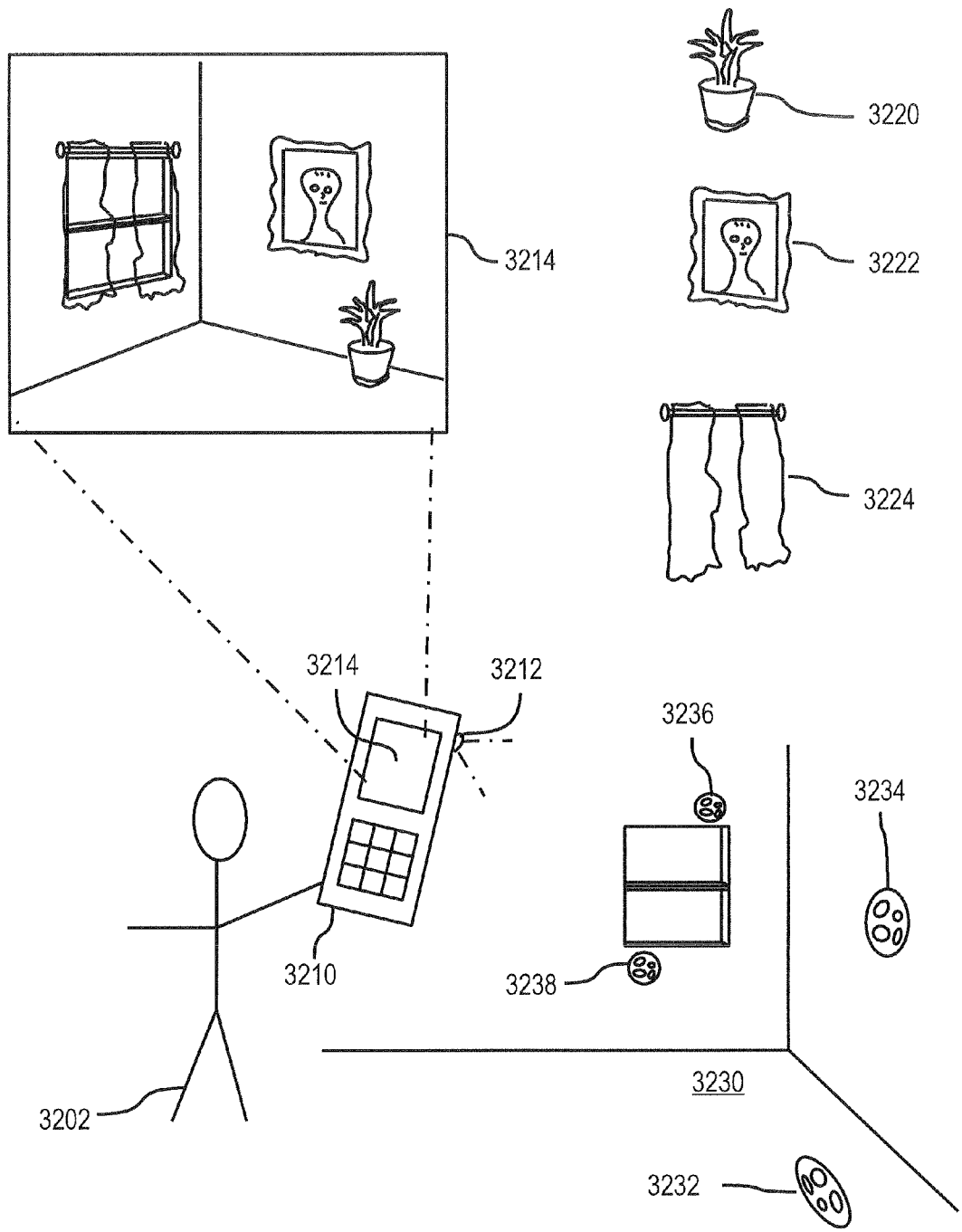

FIG. 32 is an illustration of a use of the targets in an augmented reality application.

DETAILED DESCRIPTION

Lens Projection

A lens projection model is essential for recognizing shapes as distorted by perspective. The lens projection model maps physical locations in 3-D space to the 2-D space of the recorded image.

Figure 1:
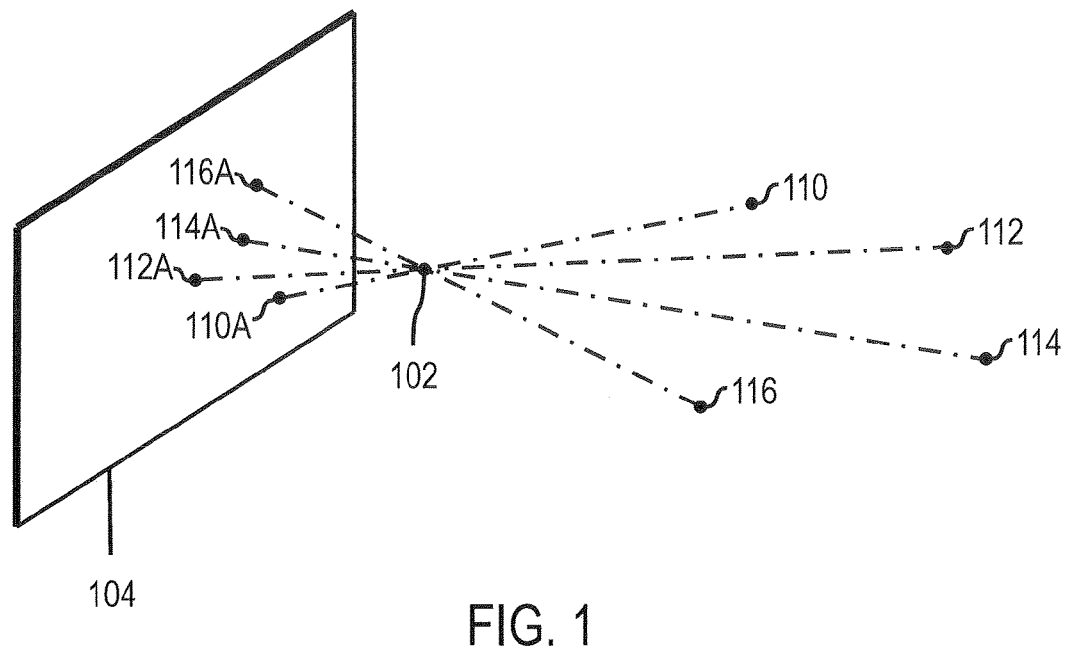
FIG. 1 is an illustration of pinhole camera projection.

FIG. 1 shows a simple lens projection model. A pinhole 102 allows rays of light to project along straight lines onto an imaging plane 104. The imaging plane 104 would have a light sensitive sensor such as a Charged Coupled Device (CCD). Points in 3-D space 110, 112, 114, 116 are projected along straight lines through the pinhole to points on the image plane 110A, 112A, 114A, 116A, respectively.

Figure 2:
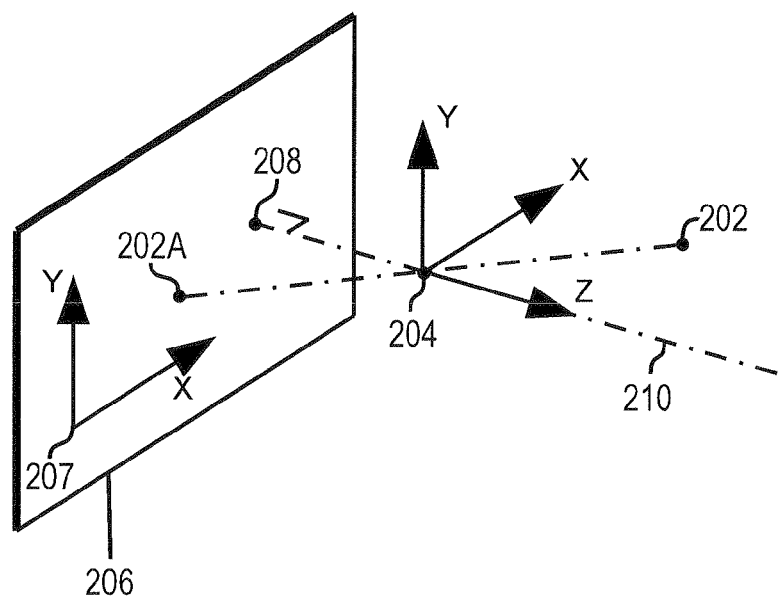
FIG. 2 is an illustration of coordinate systems used to map projection.

FIG. 2 shows the same pinhole camera model with some explicit coordinate systems defined. A point 202 can be defined as a vector in the 3-D camera coordinate system (or camera space) 204, whose origin is the "perspective center." This 3-D vector projects onto the image plane 206 as point 202A in the 2-D image coordinate system 207. Those familiar with the field will recognize that in this model, the distance between the pinhole 204 and the imaging plane 206 is the focal length of the image, and the 2-D image location 208 where the optical (Z) axis 210 projects onto the image plane the principal point of the image. Although image sensors such as CCD devices have a fixed resolution, it should be noted that it is still useful to represent continuous values in the 2-D imaging space. A circle, for example, may have a center that can be resolved to an accuracy that is much higher than the physical resolution defined by the number of pixels in the sensor.

While pinhole cameras do not collect enough light for practical uses, their model of projection has some desirable traits. Straight lines observed in 3-D camera space project to straight lines in 2-D image space in the pinhole model, and this model of projection is what subjective viewers most expect to see. Lens systems generally strive to equal the pinhole projection model as closely as possible. Using this model and images recorded with very good lens systems can use trigonometry to make direct measurements.

Figure 3:
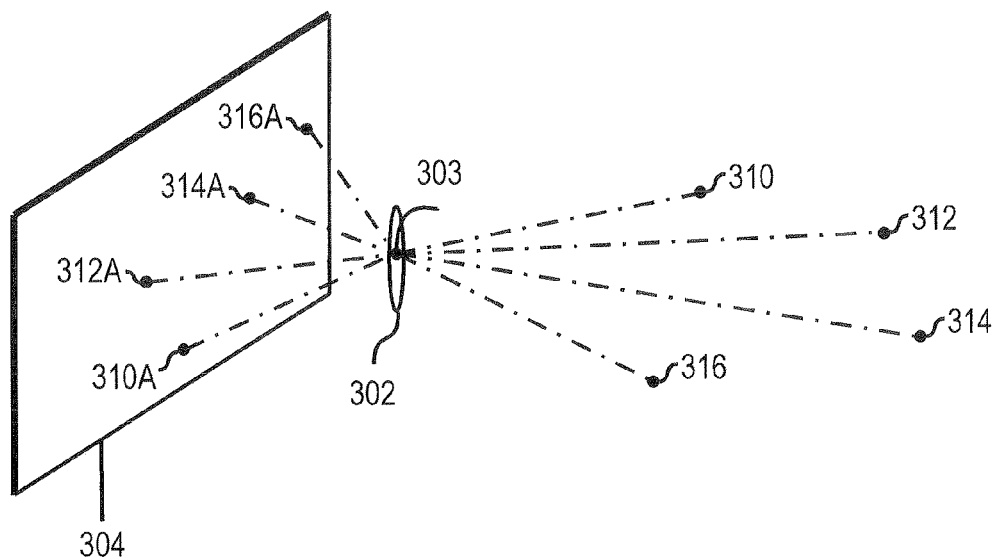
FIG. 3 is an illustration of a non-pinhole projection.

Unfortunately, it is not practical for low cost cameras such as those present in ubiquitous mobile devices (e.g. cell phones, portable digital assistants, and the like) to project light accurately to the pinhole model of projection, and lens distortions that deviate from this ideal projection model are common. FIG. 3 illustrates 3-D points 310, 312, 314, 316 of the subject matter projected to 2-D image points 310A, 312A, 314A, 316A through a lens system 302. Note that in this more general model 3-D points do not project in a straight line onto the image plane. All rays captured from the lens do, however, converge at (or emanate from) a central point in the lens system called the perspective center 303.

Figure 4:
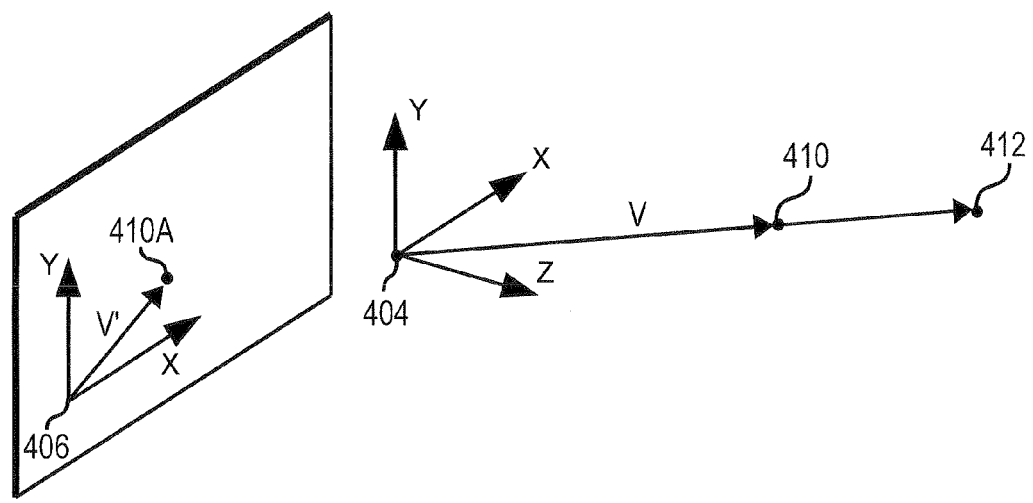
FIG. 4 is an illustration of coordinate systems and rays used for generalized projection modeling.

FIG. 4 illustrates the coordinate systems for a generalized projection. 3-D point 410 can be represented by vector V in the camera coordinate system 404. The vector projects to a two-dimensional point 410A in the image coordinate system 406 through a projection function 'Proj':

$$\text{Proj}(V) = V'$$

The projection function Proj produces a 2-D output that is of one lower dimension than its 3-D input. As such, it is not invertible; all points along the same vector direction as V, for example 3-D points 410 and 412, have the same projection to image coordinate vector V' in this projection model. Although no inverse function exists to recover a specific 3-D point from its projected 2-D point, the set of all possible 3-D points can be mapped with a 'Ray' function:

$$\text{Ray}(V') = V$$

The Ray function returns a unit length 3-D vector that can be scaled to result in all possible 3-D locations of the point projecting to V'. The functions Proj and Ray can be considered pseudo-inverses:

$$\text{Proj}(\text{Ray}(V')) = V', \text{ and}$$

$$\text{Ray}(\text{Proj}(V)) = Vk, k \text{ being an unknown scalar.}$$

Any lens projection type can be abstracted to these two functions. A generic lens model is defined as any lens model that is expressed in terms of a Proj( ) and a Ray( ) function.

In practice, projection functions are often fairly general models that accept a number of parameters to account for different lens types and variations in manufacturing of camera assemblies. In photogrammetry, the lens model parameters are referred to as the camera's intrinsic parameters. The most common intrinsic parameters are focal length, principal point location, and distortion coefficients. A camera model may require any number of parameters (p) to accurately map 3-D camera space vectors to 2-D image coordinates:

$$V' = \text{Proj}(V, \vec{p}), V = \text{Ray}(V', \vec{p})$$

The lens model and projection parameters can be determined for a camera device through calibration. The projection of even the lowest cost camera devices can be mapped very accurately in terms of projection, typically to sub-pixel precision. Unfortunately, many other aspects of image capture contribute distortions that are not so predictable.

Image Distortion not Due to Projection

Figure 5:
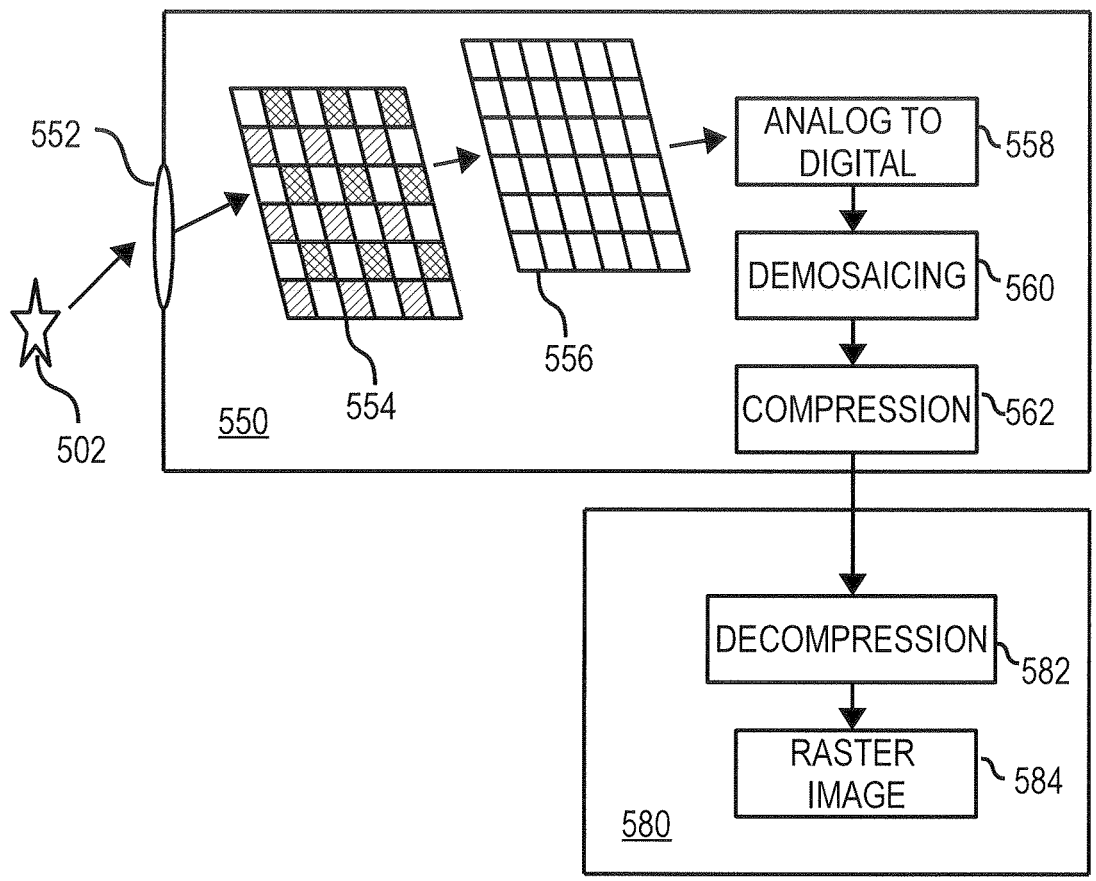
FIG. 5 is a block diagram of a method for low end image capture device.

In addition to lens distortion, low cost digital cameras have many other distortions that affect the captured and perceived image. FIG. 5 shows how an image is transformed when being captured by a typical low cost mobile camera. The transformations typically occur within two hardware modules—the camera assembly 550 and the CPU 580.

A 2-D pattern 502 is placed in 3-D camera space and projected by the lens projection model into a 2-D pattern on the imaging sensor surface. The projection, however, is often not in focus, so the pattern of light that falls on the sensor is generally blurred. There may also be internal reflections or irregularities inside the optics that contribute to the blurring, making it difficult to resolve sharp features.

Because low cost camera devices have only a single CCD to detect three channels of color (such as red, green, blue), a color filter 554 (typically a Bayer Filter) is utilized to selectively pass light based on frequency band. In single CDD cameras, each sensor pixel receives only one of the three-color channels, essentially trading some spatial resolution for color resolution.

After passing through the color filter, the light pattern arrives at the sensor 556, where it is sensed by a photo-detector, converted into an electric charge, and finally into a digital signal by an analog to digital converter 558. The fixed pixel resolution of the sensor causes aliasing in the image, and the limited color depth of the analog to digital conversion contributes quantization errors as well.

The sensor also picks up a background level of random noise generated from internal heat in the electronics.

The exposure time for images is most often automatic. A processor, looking at previous frames determines the exposure time for the CCD. In responding to the changing brightness level, the gain on the image sensing is adjusted in order to produce an aesthetically balanced image.

As the sensed image passes through a color filter 554, the measured intensity of each pixel corresponds only to one of the three-color channels. Through a method called demosaicing 560, three-channel color information for each pixel is collected by interpreting color information from neighboring pixels.

Finally, the image may be compressed 562 via JPEG or other lossy compression methods before being transmitted to the device's CPU. Within the CPU, the image is decompressed 582. Compression and decompression add additional random noise and reduce the sharpness and fidelity of the image. The raster image is then available to the CPU for use by application programs. Though in FIG. 5, the example was a mobile device such as a phone or PDA, image degradations are similar for many other application platforms.

The image transformations outlined above result in several degradations on the recorded signal, including:
1. The image is blurred because of lack of sharp focus, inner reflections in the optics, and demosaicing.
2. The image includes noise (from sensor background noise, and lossy compression).
3. The image intensity will be arbitrarily and non-linearly scaled (by auto exposure, auto-gain, clamping, and gamma intensity adjustment).

The specific combination of blurring plus nonlinear intensity scaling causes an apparent boundary shift that contributes to the difficulty in reliably recognizing patterns at a low resolution.

Boundary Shift Effect

Figure 6A:
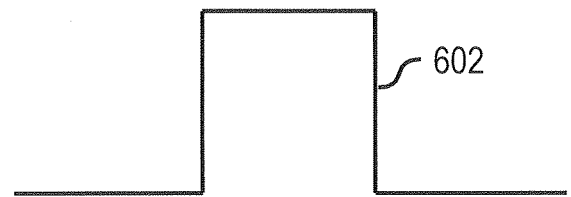
Figure 6B:
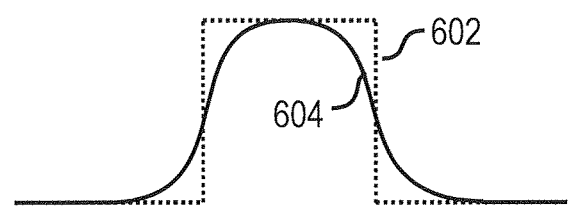
Figure 6C:
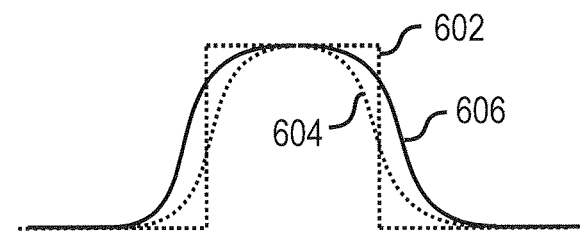
Figure 6D:
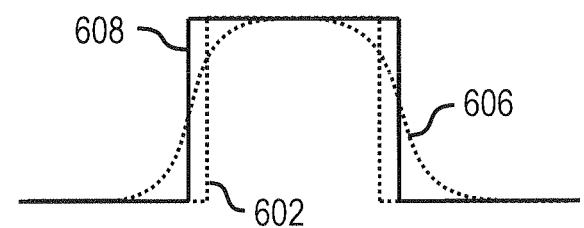

A boundary shift effect is illustrated as a one-dimensional signal in FIGS. 6A through 6D. FIG. 6A shows an original one-dimensional signal, a square wave 602. After being blurred in FIG. 6B, the pattern loses its high frequency components, and the sensor picks up smoothed signal 604. FIG. 6C introduces nonlinear scaling and the signal becomes distorted 606 towards the high or low intensity. Finally, in FIG. 6D, a signal detection based on intensity thresholding or gradient values is used to reproduce the recovered square wave signal 608. Notice that in this example, the reconstructed square wave 608 appears to shift outward compared to the original square wave 602.

In low resolution or out of focus images the effects of this boundary shift are significant, making it difficult to recognize the projection of shapes at their proper scale. The size and other characteristics of the affecting blurring kernel are not predictable, nor are the characteristics of the intensity scaling. The result is a boundary shift phenomenon that is difficult to predict or correct when detecting shapes at low resolutions in poor quality images.

The examples in FIG. 7 illustrate the results of the boundary shift and blurring effects on detected 2-D patterns. A square pattern 702 is detected by a low-resolution camera. Because of these effects, this pattern might be detected as a rounded, shrunken pattern 704 or a rounded, enlarged pattern 706. The star pattern 712 could be detected potentially as patterns 714 or 716, and an ellipse 722 could be detected potentially as shrunken 724 or enlarged 726.

In each of these examples, sharp features such as corners are completely lost, and the resulting rounded shapes are offset arbitrarily towards high or low intensity. Note that in the case of the ellipse, the detected pattern changes size and aspect ratio, but the boundary shifted shape can always be well approximated by an ellipse.

Present Disclosure

The described system relates to a target, methods for generating a plurality of recognizable targets, and methods for detecting, locating, and determining the 3-D pose of the targets.

Qualities of the Target

In an embodiment, the target can be a two dimensional pattern. Hereafter referred to as the marker, target, or "amoeba target," the pattern can be constructed from any medium able to produce contrasting levels of energy emission or reflection that can be sensed by a device such as a camera. The camera could have a single sensing channel or be multi-channel (e.g. RGB), in which case the image can be reduced to a single channel for detection. There are many other sensing technologies usable with the described system including CCD, CMOS, Foveon™, Pixim™, and chemical sensors (such as film). In this discussion, CCD sensors will be used for convenience.

Luminance is a conveniently extracted single-channel image, and will be used in the description of the target. However, the reader should understand that this single channel could just as well represent a match to a specified chroma, contrast between spectral samples, or any other derivable single channel image. For ease of explanation, the target is described in terms of visible light, but also is applicable to images sensed from energy outside of the visible range (e.g. infrared light).

The target contains regions of alternating color or, more broadly, intensity that can be detected by the camera. In one embodiment, this is accomplished by printing the targets on paper with an ink-jet printer. In another embodiment, the targets are stamped out of a metal template, or laser-inscribed onto a part. In yet another embodiment the target is a stencil mask in front of an active energy source such as a light source. In yet another embodiment the target pattern is projected onto a surface. In yet another embodiment the target is a metal disk implanted in a patient that is detected by an x-ray or medical scanning sensor.

Description of the Target

FIG. 8 shows a sample target which is comprised of a filled background shape 802 containing multiple ovoid or more particularly, elliptical foreground figures 804, 806, 808, and 810. The foreground figures can be any variety of ovoid shape or region. For simplicity, however, the specification refers to the figures as being the more particular elliptical shape. The elliptical figures 804, 806, 808, and 810 are spaced no closer than a minimum distance delta 818 to each other and to the boundary of their background shape 812. This minimum delta exists to ensure some insulation from the perceived boundary shift, and to ensure that details of the target are not lost due to insufficient image resolution. All elliptical figures have a minor axis length 814 no smaller than the minimum delta. The layout of figures on the target is rotationally unambiguous (non-symmetrical). The figure shapes and placement serve to compactly identify the target as a whole, and also to uniquely identify each of the figures on the target.

Using ellipses for the foreground figures is ideal for a number of reasons. Ellipses projected through a lens still closely approximate elliptical form, and the boundary shift effect on an ellipse produces an elliptical shape as well. Thus, we know that we are looking for an ellipse rather than a variety of different possible shapes. The center of an ellipse can be located very accurately as the gray scale values of many pixels contribute to its location. Ellipses have several characteristics that can be used to encode data or identify the target, including size, aspect ratio, and orientation. Each of these features can be used to differentiate and identify targets and their figures in a compact space.

An embodiment includes a safety region 816 having a width that measures the minimum delta surrounds the perimeter of the background shape to differentiate it from the underlying medium or surface on which it is printed, formed, or otherwise located. The outer boundary of the safety ring is typically not drawn, but acts as a minimum margin between the target and the boundary of the medium or surface on which it is printed. If the environment in which the target is placed naturally contrasts the background shape of the target, the safety region need not be printed as part of the target.

Targets can be represented with two different polarities, essentially doubling the number of detectable designs. Targets can have either a dark background shape with light figures and safety region, or a light background shape with dark figures and a dark safety ring. FIG. 11 is an example of a target designed with inverted intensity.

Variations of the Target

In some applications, it is desirable to create targets with additional design constraints to simplify identification or data encoding, or to limit the designs to an aesthetically pleasing set.

For example, the target design is typically constrained to use a fixed ratio of total foreground figure area to background circle area. The total area of the foreground figures divided by the area of the background shape is a fraction that is referred to as the figure-to-background area ratio. As will be discussed in upcoming sections, having a fixed area ratio simplifies the identification of targets.

The foreground figures can be further limited to facilitate explicit data encoding schemas. Figures chosen from a fixed palette of various sized and shaped ellipses allow the target to encode digital information by an inventory of the figures present without having to specifically identify each figure or examine the pattern of placement.

Targets can also utilize color, or other multi-spectral qualities to encode additional information. One method of incorporating color into targets is illustrated in FIG. 9. In this example, the target background 902 is colored black, and the foreground figures 910, 912, 914, and 916 have each been assigned a different light intensity color that is indicated by hatching patterns. Each of the light colors encodes with approximately the same light intensity when converted to luminance. This target can be detected by a black and white camera or color camera. When detected by a color camera, however, the color can be sampled inside each figure to extract data from the target or create more target identities. Consider for example if each foreground figure in FIG. 9 is assigned one of six light intensity colors. The target then encodes four to the power of six, or 1296 possible codes in addition to its target identification based on the overall pattern.

FIG. 10 illustrates another method of encoding color into a target design. The number of target designs for a given space can be increased significantly by separating the target into separate color channels. For example, the target in FIG. 10 has a low luminance black background shape 1050, and two sets of high luminance colored foreground figures. Foreground figures 1060, 1062, 1064 and 1068 are given one color (red, for example), while figures 1070, 1072 and 1074 are given a second color (green, for example). Regions where two colors overlap 1080 are given a third color that is the addition of the two colors (yellow in this case). This can be performed with any number of color channels that can be sensed separately by a camera.

The colors are chosen such that they can be added in regions where they overlap, and can be extracted from a color image as separate (non-overlapping) channels. When an image is captured, a number of color channels are extracted from it as intensity images. The black background circle is detected in each image that signifies the presence of a target. The target identification then uses the color of each figure as a feature of identification. The number of figures that can fit on a small target is increased in this method with the addition of each separate color channels. As each channel experiences a different boundary shift distance, the shift distances can be used as a measure of the color of the light illuminating the target.

To achieve a more aesthetically pleasing layout, the placement of the figures can be restricted to "balanced" designs. In such designs not only are the figures placed no closer than the delta minimum distance, but the figures are placed so that their boundaries achieve the maximum separation possible, in the same manner that ellipsoids with similar electric charge would position and orient themselves apart from each other in order to achieve a minimum energy state.

FIG. 12 illustrates that a target may have any number of foreground figures. FIG. 13 illustrates that foreground figures may contain other foreground figures. In addition to ellipses, the foreground figures can be composed of more general non-symmetrical ovoid shapes. More general ovoids increase the number of recognizable targets by adding another identifiable characteristic to each figure.

FIG. 14 illustrates a target that uses a square background shape rather than a circle. Any shape that can be recognized after projection and boundary shift transforms can be used as a background shape.

Though not necessary for detection, additional figures may be added outside of the background shape. FIG. 15 shows a target of a circular background 1502 printed on a rectangular label 1504. The addition of satellite figures 1510, 1512, 1514 and 1516 in the four corners of the label allow the target's orientation to be determined to a greater precision, while utilizing mostly unused space on the square label.

Each satellite figure is placed outside the safety region 1504 of the target. The satellite diameter is at least delta, and the satellite comes not closer than delta to the edges 1520, 1522 of the label.

Target Model and Metrics Spaces

At least two coordinate systems can be used to describe target models. "Model Space" is a geometric space used to define the 2-D target pattern, whereas "Metrics Space" is a parametric space for describing the target patterns invariant to their rotation.

Target geometry is represented in a two-dimensional modeling space (a Cartesian coordinate system). A unit circle representing the background shape is centered at the coordinate system's origin. A target can then be represented by an ordered set of ellipses that overlay the background circle. Each ellipse is represented by its geometric features such as center point, major and minor axis vectors. A target described in this 2-D space is called a "Target Model".

Though modeled at unit scale, it is typical for a target to be printed at non-unit scale. The scale of the target need not be known to identify the target, but once identified the scale is necessary to properly extract the 3-D positioning of the target. Typically, an application will store a table indicating the printed scale of each target model.

Since detected targets will be arbitrarily oriented, a target metrics space is used to store a rotationally invariant representation of the target. Targets are more easily matched in metrics space as we do not yet know the detected target's orientation.

Some characteristics of the figures such as area (as fraction of background) and aspect ratio can be extracted with invariance to rotation. Other properties can be extracted with the aid of construction spokes and the rotational ordering of the figures (though this requires that the targets are constructed with the additional constraint that no figure be centered at or close to the center of the target).

As indicated in FIG. 16, spokes 1602, 1604, 1606, and 1608 are drawn from the center 16 of the background circle through the center of each elliptical figure. The distance of the center of the ellipse 1612 to the center of the background figure 1610 can be used a phase-invariant property, as well as the angle 1614 between the current spoke and the next spoke in counter clock-wise order. If the ellipse has an eccentricity greater than 1.0 (not circular), the angle 1616 between the spoke 1602 and the ellipse major axis 1616 is also invariant to rotation. Metrics space is a multi-dimensional space comprised of dimensions associated with a set of these qualities, each scaled to a unit range [0 . . . 1].

FIG. 17A illustrates the representation of a target in a three-dimensional metrics space 1750. In this example, the dimensions of the space correspond to figure aspect ratio 1752, figure area 1754, and distance of figure center from background center 1756. An elliptical figure can be described as a point in this metric space, such as points 1760, 1762, 1764, and 1766, which as a set comprise target identification.

FIG. 17B illustrates an attempted match of the target with a target comprising figures in metrics space 1780, 1782, 1784, 1786. For each possible pairing between the two sets of points being matched, every combination of assignments between the two sets of points is tested for minimum total distance squared. Targets can be ordered in angle about the background center in order to reduce the number of combinations of assignments that need to be tested to find the best fit.

Target Libraries and Coding Schemas

Several schemas may be utilized to identify a target or extract encoded data. One schema is to create a library of targets that vary in metrics (or can otherwise be differentiated from each other) and then to assign each target an identification. The identification could represent, for example, a number, a letter, or meaning such as, "kitchen counter top."

The library is created by randomly generating a variety of target designs that satisfy the figure construction requirements (such as area ratio and minimum clearance) and then selecting a subset of targets with a low confusion rate. Confusion rate is the measure of the best possible match between two targets, an ideal measure of which would be the area of foreground figures not matching when overlaid on top of one another at their best possible rotation. A more practical measure is the error norm between target as expressed in metrics space, or the best fit distance squared between the metric space points represented by each figure. A set of figures generated with these rules is illustrated in FIG. 18.

In this schema, detected targets are compared to known figure configurations stored in the library. As part of the detection, detected targets are also converted into metrics space. Matches of detected targets are performed by comparing the distance in metrics space between figure points, and if a rotational assignment between the figures is found which produces the lowest error measure within an acceptable range, it is deemed to be a match. Performing the match in this way also identifies each detected ellipse by assignment to a figure in the model shape.

In another coding schema, the figures comprise predetermined shapes. FIG. 19 illustrates one such schema where ellipses are composed from a fixed set of areas and aspect ratios. In this chart, each ellipse in the figure palette is assigned a unique symbol. The chart resembles chemistry's periodic table, where each ellipse would be a unique element.

A target, being analogous to a molecule, can be described in terms of the figure symbols and counts. For example, a target composed of three ellipse D's and an ellipse P and an ellipse W can be notated as compound $D_3PW$. FIG. 20A illustrates one possible target composed of these elemental figures.

As position and orientation of the figures is not a part of the compound description, arrangement of the figures can be used as well to differentiate target identifications with the same compound description. FIG. 20B illustrates another target design for the target composed of $D_3PW$.

To facilitate a consistent figure to background area ratio, the predetermined figures are generated with set areas. Any combination of these predetermined figures can be selected whose areas sum to the desired total area ratio (e.g., 20%). The ability to identify the set of figures individually narrows the search for our target significantly. In some cases the compound description of a target is sufficient to identify a given target and assign detected ellipses to their corresponding figures.

For background shapes other than circles, where there are limited rotations possible (square, rectangle, polygon, and the like), the figures can be transformed with each orientation and the match can be made directly from the 2-D model space target descriptions.

Detection of Targets

FIG. 21 is a flow chart of a target detection, recognition, and pose determination method. The source raster image 2110 can be provided from an image file or from a live source such as a CCD camera. Prior to detection, the image may be transformed by image processing such as gradient removal, sharpening, or color key extraction. The input image of box 2110 can be in a single channel (e.g., luminance) raster.

After being converted to luminance, ellipses (or background shapes) are detected 2120 within the image. Ellipse detection within with the described system can be performed in any number of ways. These include, but are not limited to, Hough Transform based methods, chain-code based methods, and point fitting methods.

One embodiment of the described system detects ellipses by generating contour loops where the interpolated image crosses a specified intensity value. The perimeter of each loop is fit to an ellipse and the residual of the fit determines if the contour should be discarded or stored as an ellipse (ellipses which are not part of any target may also be detected, but are features of the image background to be discarded later).

Once all ellipses in the image have been detected, a search for multi part shapes 2122 composed of the detected ellipses is performed. A "multi part shape" is a shape that contains other shapes. A tree structure of "containment" is created in memory in which each ellipse has an associated list of child ellipses that it alone contains. As child ellipses may themselves have children that they alone contain, the tree represents multi-level hierarchy of nested containment. This containment tree is created by first sorting all ellipses based on area, and then working from largest to smallest, determining if a sample point in each ellipse falls within any larger area ellipses. All ellipses containing other ellipses are deemed multi-part shapes and passed on though the rest of the detection pipeline (for cases of square, rectangular, or polygonal background shapes, the background shape is first detected in the image, and then the search for ellipses can be restricted to inside the potential background shapes).

The multi-part shapes are then corrected for proper figure-to-background area ratio 2124 to match those stored in memory in a shape library, schema, or database 2112. This is accomplished by measuring the ratio of the total foreground figure area to background shape area and then determining an offset distance that can be used to increase or decrease the size of each ellipse (as well as the background shape) in order to achieve the proper area ratio.

The offset background shape and foreground ellipses are then passed through a model space conversion 2126. The figures detected in screen space are converted into figures defined in model space. In one embodiment, the shape of the target background is used to generate a linear scaling transform that is applied to all foreground figures to convert them to model space.

Next, the shape is matched 2128 to shapes from the shape library or schema 2112. Matching is performed by extracting detected target metrics (such as center distance and angle, major and minor axis lengths, and orientation of sufficiently non-circular figures) and then comparing them to metrics of the members of the target library. When a match is found, an identification of the target is made and each elliptical figure in the target is assigned to its model space counterpart 2140. The center location of each elliptical figure, as well as that of the background shape, can be used as 2-D identified coded targets with traditional photogrammetry systems.

In box 2130, 3-D position and orientation of the target are extracted. Through estimation, and potentially optimization, two potential 3-D poses for the target are generated and ranked in terms of fit. Figure centers are used to measure fit as reprojection error. Image gradient flux across the projected boundary can also be maximized to refine poses based on the raw raster data 2110. Typically, the pose identified as most likely (primary) will have a much better measure of fit than the pose identified as secondary, making it clear which pose is correct. In cases where there is insufficient perspective information, either pose could be correct, and the pose must be disambiguated through external means (such as agreement with other targets, assumptions based on the application of use, or by user selection).

The components of FIG. 22 are a sample illustration of geometric data resulting from the method we describe above in relation to FIG. 21.

Figure 22A:
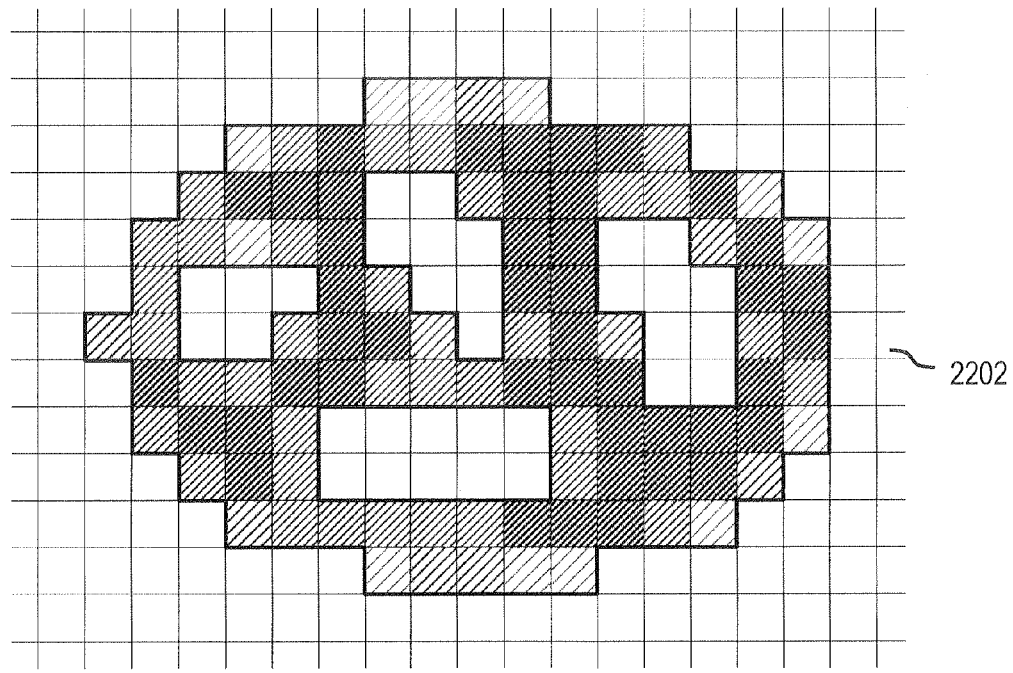
Figure 22B:
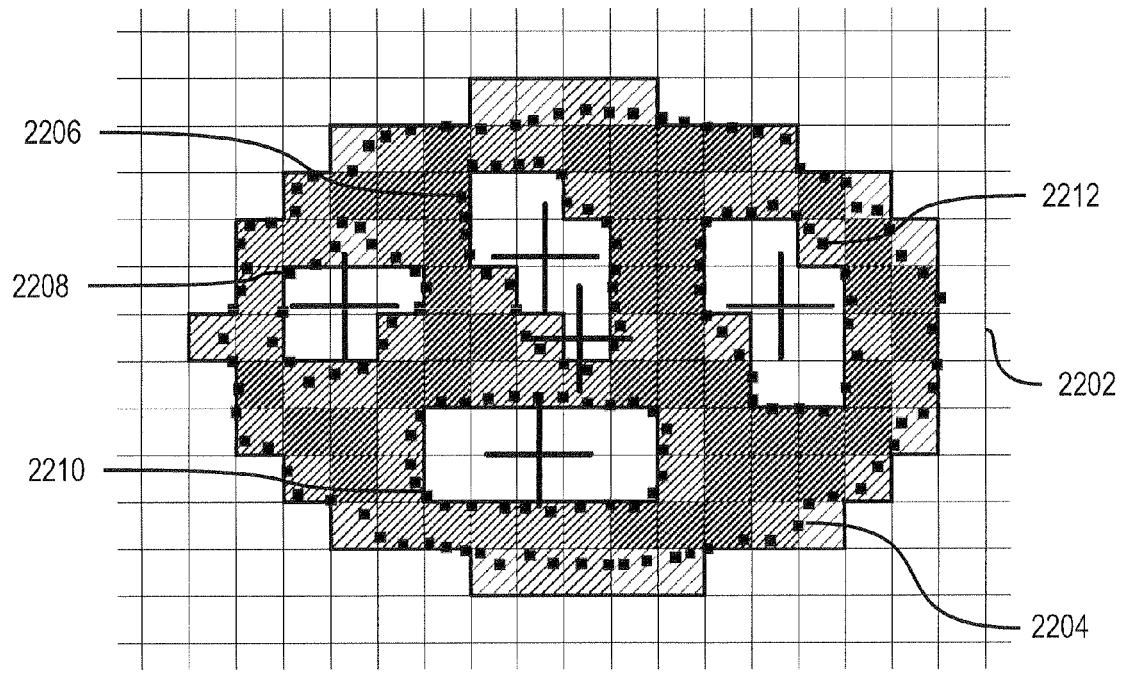

FIG. 22A is a five shade rendering of a 256 shade raster image 2202 captured from a CCD camera. FIG. 22B shows dot outlines of contour polygons 2204, 2206, 2208, 2210, 2212 extracted at a fixed intensity value. The contours in this illustration are drawn as points without connections, but the points are in fact ordered, and form polygons. Crosses shown are positioned at the centers of mass of these polygons.

Figure 22C:
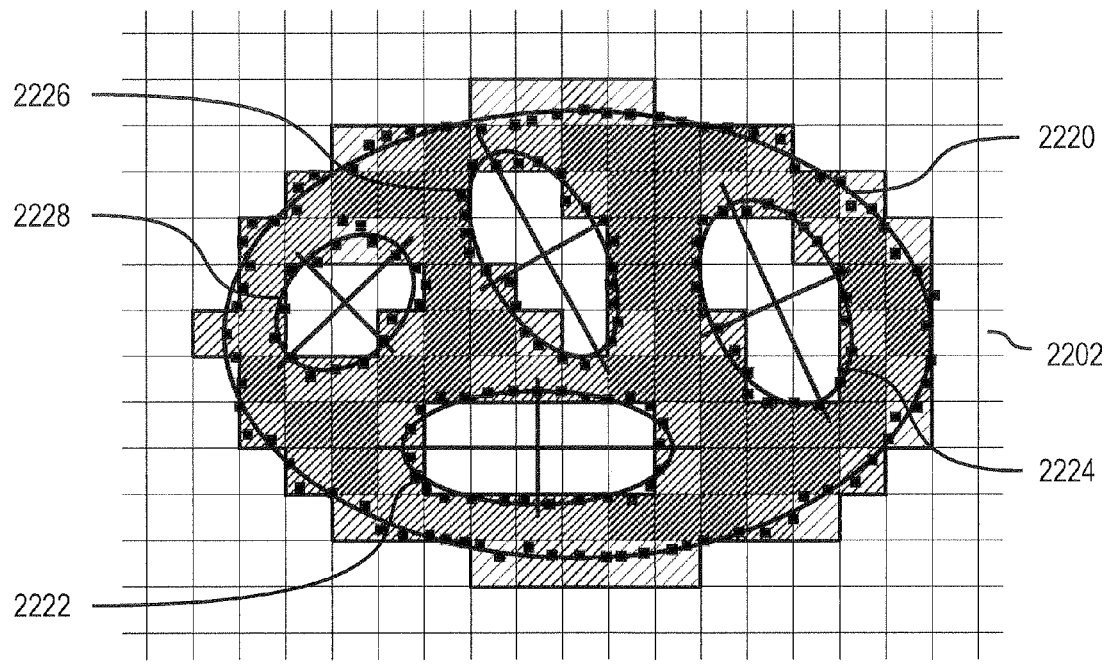
Figure 22D:
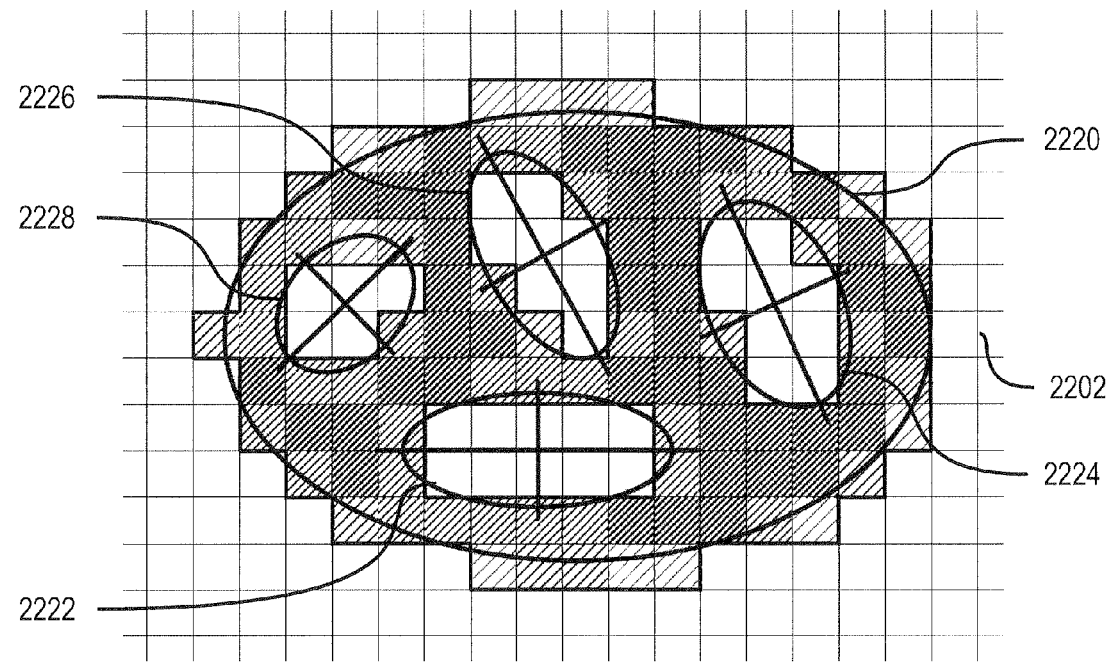

FIG. 22C shows each polygon fit with an ellipse 2220, 2222, 2224, 2226, 2228. FIG. 22D shows the ellipses without the polygons. The ellipses are then grouped into a containment tree and identified as a potential target consisting of a background figure and four foreground figures.

Figure 22E:
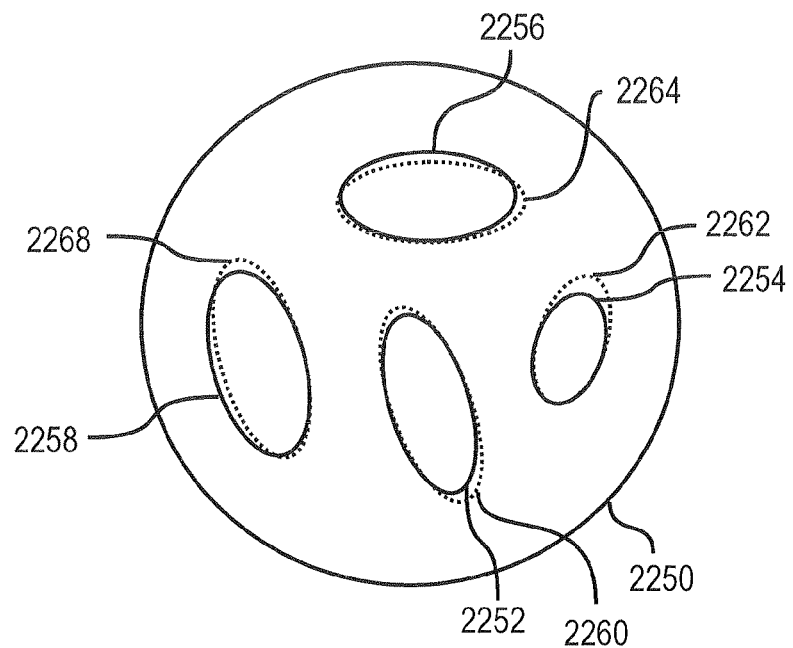

The potential target is adjusted for boundary shift, and then transformed into model space, as shown in FIG. 22E, where the background figure has been transformed to the unit circle 2250. The foreground figures 2252, 2254, 2256, 2258 have undergone the same transformation, and now can be compared to targets in the target library. A match is made to a target "C1" (shown in dashed lines) whose figures 2260, 2262, 2264, and 2268 closely approximate the figures of the detected ellipses.

Each detected ellipse is assigned to its corresponding figure in the target model, and then two 3-D poses of the target are approximated. Each pose is refined to minimize the error norm between the model figures' projected locations and the observed ellipse centers. The pose with the smaller reprojection error is chosen as the primary pose.

Figure 22F:
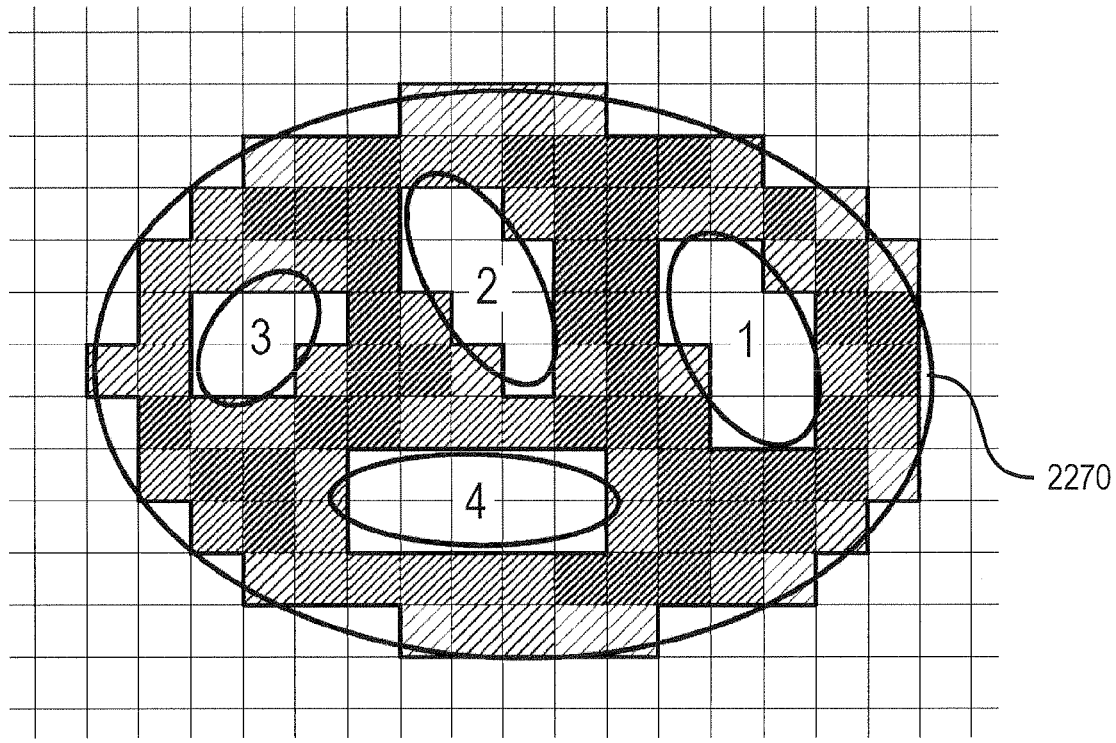

FIG. 22F shows the target figure 2270 transformed from target model to camera space by the primary pose and projected on top of the raster image.

Determination of 3-D Pose

FIG. 23 is a flowchart that illustrates one embodiment of the 3-D pose determination submethod, shown in FIG. 21 at 2142. Pose determination may include both estimation and refinement. Pose estimation is a fast and direct method, while pose refinement is iterative and requires more CPU time. An estimate can be used without refinement at the expense of pose accuracy.

The foreground figures and background shape are all identified and located to a high precision. Their location provides the key to measuring the accuracy of the pose. By applying a pose to a model shape, and projecting that shape with the lens model into image coordinates, the error of that projection from the observed data can be measured. This measure of fit can be used to evaluate the fit of a pose determined with any method.

Another method that can be used to evaluate the fit of a pose is a measurement called "gradient flux," computed by sampling the gradient of the source image at locations along all projected boundaries of the target shape. Points along the ellipses are projected into screen space, and then offset by the detected boundary shift. The offset locations are sampled and then a dot product between the sampled gradient and boundary normal vector is accumulated for all sample locations. This total sum is a measurement of flux across the boundary surface, and can be used as a measure of fit as well.

There are typically two poses that project very closely to any detected projection. Pose determination produces the most likely, or "Primary" poses, as well as the less likely "Secondary" pose. Each pose can be evaluated for reprojection error and typically, one pose's fit will be much better than the other. In cases where parallax has removed any perspective cues and the residual errors are found to be within the same range then pose determination will return both possible poses.

A reasonable estimate of 3-D pose can be generated from targets containing as few as one foreground figure. Let us review the information that has been extracted from the image that will be used to derive a pose estimate. The area corrected projected ellipses 2310 are available, as well as an identification of the target and each of the figure 2314. Also available is the model space description of the shape 2312. From the identification, we can infer the printed target size, and through prior performed lens calibration we have determined a lens projection model and lens parameters.

The pose estimation 2320 produces two potential poses—Pose "A" 2322 and Pose "B" 2324. Each pose can then be refined by using a nonlinear minimizing solver 2330. For targets with at least three foreground figures, refinement of the pose estimates can be made by minimizing the reprojection error of the target figures by adjusting position and orientation parameters until the best fit is achieved. The described system can be embodied with most nonlinear minimizing solvers and may, but does not require the use of derivatives. For example, in one embodiment the Downhill Simplex solver is used to refine pose.

Alternatively, for targets with at least one foreground figure, the pose can be optimized by maximizing the gradient flux of the projected shape (as offset by current boundary shift). Either fit optimization method can be used to yield an accurate pose. As the minimizing solver used to optimize finds local minimums, the pose estimates are used as starting points for the downhill minimization.

After optimization, both poses, as well as their measures of fit (by residual norm or gradient flux), are evaluated by the pose selection 2340. The pose determined to have the better fit (minimum norm, or maximum flux) is designated the Primary pose 2352, while the other pose is designated Secondary pose 2354. If satellite figure 2316 are detected close to their expected screen space locations (as projected from model space with a pose), the satellite targets are used to get an improved fit of the initial poses.

If satellites are detected, that match the projection of the primary or secondary poses, the satellites are used to fine tune the pose 2360. As with the initial refinement 2330, either technique, figure norm minimization, or projected gradient flux, can be used to perform the refinement.

Details of Pose Estimation

This section describes one embodiment of the pose estimation subprocess. Pose estimation operations take place in 3-D camera space rather than 2-D image space to insulate them for distortions of the particular lens projection model. After boundary-shift correction, the background circle provides accurate ranging data. Recall that the generalized lens projection model is pseudo-invertible; it can map from a 3-D point to a 2-D image coordinate, but also from a 2-D image coordinate back to a 3-D ray. Utilizing this ray function, we determine the 3-D rays that correspond to points on the boundary shift corrected ellipse.

FIG. 24 is a representation of these rays in 3-D camera space. Rays $R_c$ 2402, $R_a$ 2404 and $R_b$ 2406 emanate from the eye point 2410 at the origin of the camera coordinate system. $R_c$ is derived from the center of the detected ellipse, and $R_a$ and $R_b$ are derived from the boundary-shift corrected ellipse locations at the ends of the major and minor semi-axes respectively. The 3-D ray $R_c$ pierces the center of the background circle 2418 at point $P_c$ 2420 in camera space. Rays $R_a$ an $R_b$ touch the background circle at locations $P_a$ 2412 and $P_b$ 2414 respectively. Ray $R_c$ 2402 is by the nature of projection perpendicular to the section of the circle that projects to the ellipse major axis 2430 (the diameter of the background circle is preserved in any projection as the major axis 2430 of the detected ellipse, and if this projected major axis is conveyed in 3-D it will always be perpendicular to $R_c$, whereas the minor axis 2432 will appear foreshortened by perspective in the projected ellipse).

Measuring the angle theta (Θ) 2440 between rays $R_c$ and $R_a$, a simple calculation can determine the length along unit vector $R_c$ to locate the center of the background circle 2418 in 3-D camera space:

$$\vec{P}_c = \vec{R}_c \left(\frac{r}{\tan\Theta}\right),$$

where "r" is the radius of the printed target.

Point $P_a$ can be located easily as well, because rays $R_a$ and $R_c$ form a right triangle with the circle from point $P_c$ to $P_a$:

$$\vec{P}_a = \vec{R}_a \frac{r}{\sin\Theta}$$

Ray $R_b$ passes through point $P_b$ at a point that is the same distance "r" from point $P_c$. A sphere of radius r centered on point $P_C$ intersects ray $R_b$ in two locations. Modeling the ray with a distance parameter t, we obtain the following:

$$|\vec{R}_m \cdot t - \vec{P}_c|^2 - d^2 = 0$$

Expanding this into x, y, z components, $$(R_x \cdot t - P_{cx})^2 + (R_y \cdot t - P_{cy})^2 + (R_z \cdot t - P_{cz})^2 - d^2 = 0$$

which can be expressed as the following quadratic:

$$(R_x^2 + R_y^2 + R_z^2)t^2 - 2(P_{cx}R_x + P_{cy}R_y + P_{cz}R_z)t + (P_{cx}^2 + P_{cy}^2 + P_{cz}^2 - d^2) = 0$$

Both solutions ($t_0$, $t_1$) of this quadratic equation represent distances along ray $R_c$ that are the two locations for $P_c$ that will each be used to determine a separate pose.

$$P_{b0} = R_b \cdot t_0$$

$$P_{b1} = R_b \cdot t_1$$

Given three locations in space for point $P_a$, $P_b$, and $P_C$, we can construct X, Y and Z basis vectors for a coordinate system:

$$\vec{Z} = (P_a - P_c) \times (P_b - P_c)$$

$$\vec{X} = \frac{1}{r}(P_a - P_c)$$

$$\vec{Y} = \frac{1}{r}(P_b - P_c)$$

These vectors are orthogonalized to eliminate drift, then used as basis vectors to form a 4×4 pose matrix that transforms the model space target into its proper camera space plane. Determination of the in-plane (z-axis) rotation, however, is also necessary to fully transform a target model from model space to camera space.

By tracing a 3-D ray that corresponds to the 2-D center of an observed foreground figure, the 3-D location of intersection of the ray with the target plane is determined. A 3-D vector from the target center to the intersection location is converted into components along the above X and Y basis vectors. A second vector is constructed in model space from the origin to the center of the corresponding foreground figure of the target model. A rotation angle is calculated that rotates between these two vectors, and that rotation is applied to the Z-axis (via a matrix multiplication) to properly orient the target in plane.

This 4×4 matrix describes the pose of the target relative to the camera. It can be inverted in order to determine the pose of the camera relative to the target.

Details on Ellipse Detection

Figure 25A:
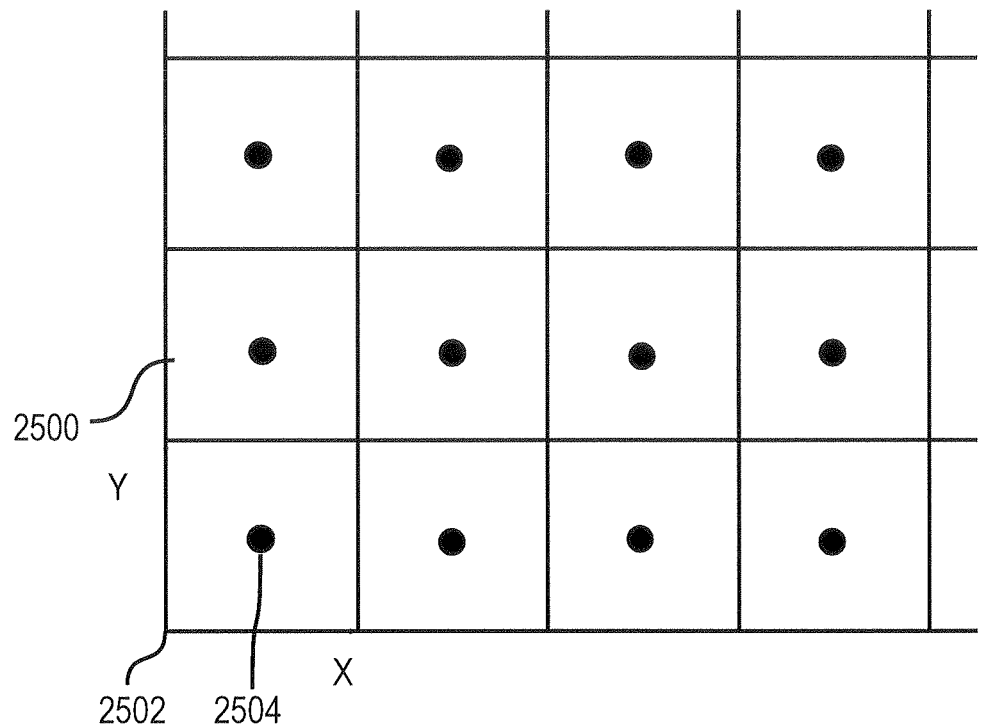

One embodiment of the described system detects ellipses using a contouring method that extracts iso-contour polygons from the image. As illustrated in FIG. 25A, a raster image 2500 consists of a rectangular array of pixels. A coordinate system is defined, the origin of which 2502 is placed in the lower left corner of the image. In this coordinate system, each pixel is one unit wide and one unit high. The center of the first (lower left) pixel 2504 is at coordinates (0.5, 0.5).

Figure 25B:
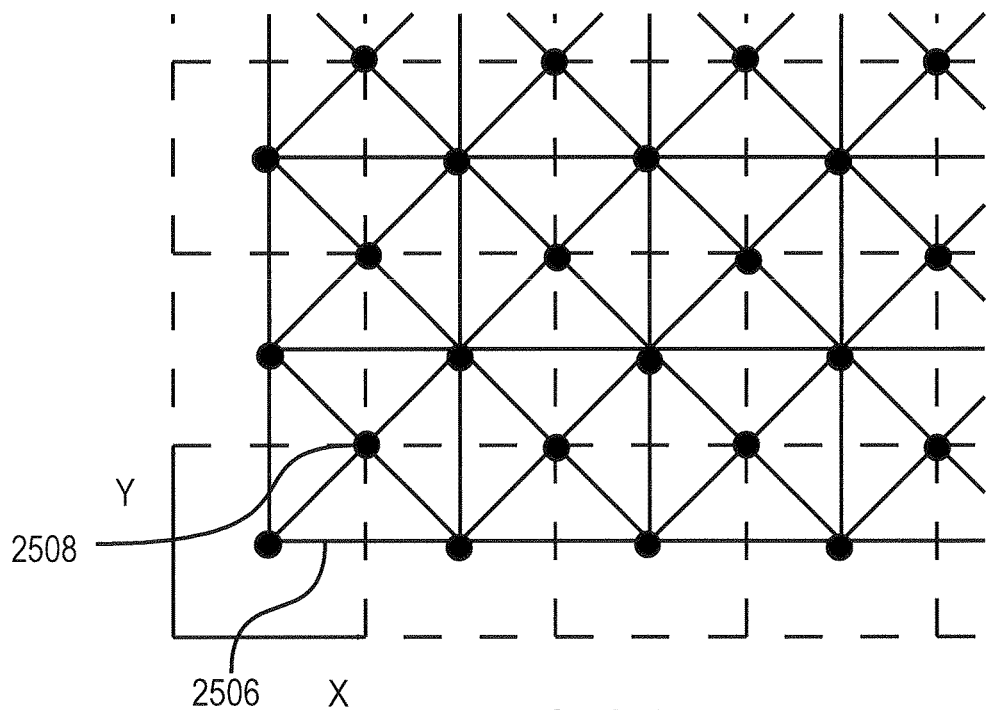

In FIG. 25B, a triangular lattice 2506 is superimposed over the pixels. The triangles have vertices both at pixel centers but also at pixel corners such as point 2508. The values at pixel corners represent the average value of the four pixels sharing the corner. This value need not be stored, it can easily be calculated from the four contributing pixels. An alternate method of triangulation does not use an averaged corner point, but simply divides each square between four pixels into two triangles. Although this produces adequate results using only half the number of triangles, the resulting polygon in not as precise.

Figure 25C:
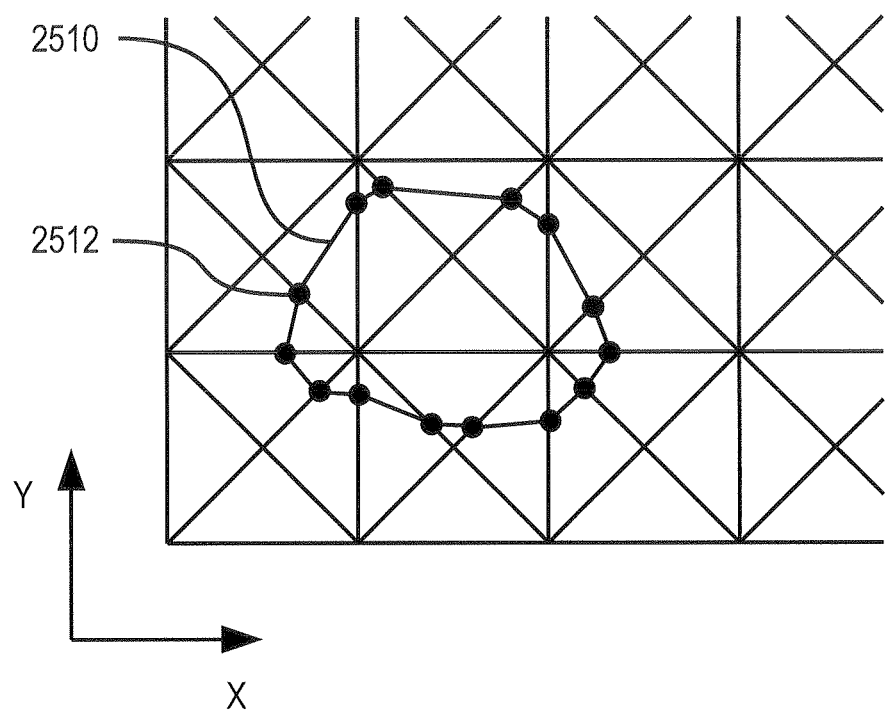

FIG. 25C shows an iso-contour 2510 which is extracted by selecting an intensity value at which iso-contour polygons will be extracted. The iso-contour is analogous to single elevation contour in familiar elevation contour maps. Linear interpolation can be used between the three corners of a triangle to find a directed line segment that represents the crossing of the intensity value inside the triangle. The collection of segments form a closed polygon represented by an ordered list of 2-D vertices. The vertices (for example 2512), all fall on triangle edges.

As the iso-contour algorithm scans through a raster image, it produces polygons representing the iso-contour loops. These polygons are fit with ellipses when they are extracted, and evaluated for quality of fit by best fit ellipse. Ellipses and their source polygons are only stored if the ellipse fit to the polygon have a low degree of error. All other polygons (and their poorly fitting ellipses) are discarded and do not require storage or further consideration.

A binary "visited" flag is stored for each triangle to be evaluated and initialized to false. Each triangle that has not yet been marked visited is evaluated as a potential start of a polygonal loop that crosses the detected iso-intensity value. As each triangle is evaluated, its visited flag is set to true. If a triangle does cross the intensity threshold, the exit point of the directed segment is determined, as well as the neighbor triangle which contains the next segment. By traversing from triangle to triangle, a list of points is collected, and each triangle is marked as visited. The loop is completed when we arrive back at the original triangle. If the contour leads us off the screen, we can discard the partial loop.

Figure 25D:
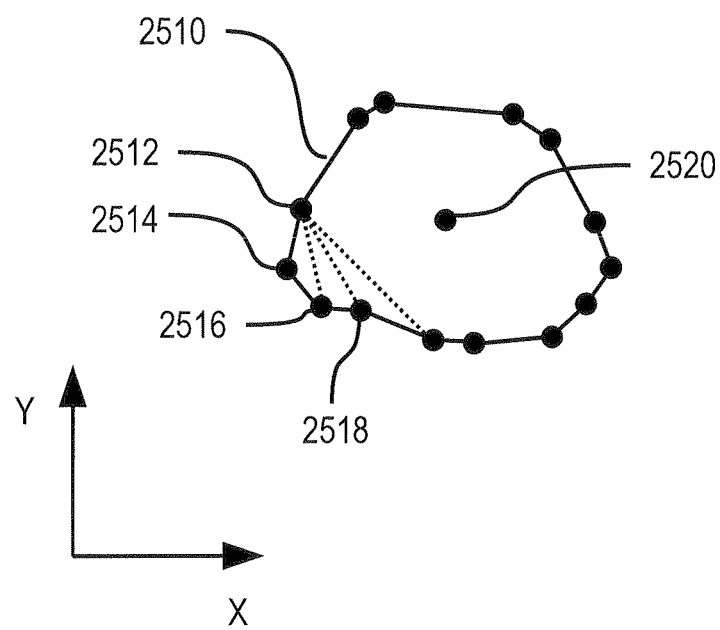

FIG. 25D illustrates an extracted polygon 2510. A triangle fan is created between the first point 2512, and the sequence of points making up the polygon. For example, the first triangle is between points 2512, 2514, and 2516. The second triangle is between points 2512, 2516, and 2518. For clarity of the illustration, not all triangles are drawn but the entire polygon is represented as a single triangle fan.

A cross product is used to determine a signed area for each triangle, and the vertices are averaged to find the center of mass of each as well. A center of mass for the polygon 2520 is calculated by finding the weighted average of all triangle centers in the fan. As the average is weighted by signed area values, it does not matter if the polygon is concave or convex.

The ellipse fitting method is iterative and requires a starting point for the ellipse's center. A good approximation for the best fit ellipse's center allows the best fit ellipse to be found in a small number of iterations. The center of mass of the polygon is typically very close to the center of the polygon's best fit ellipse's center, so it provides a good starting point for iteration.

Figure 25E:
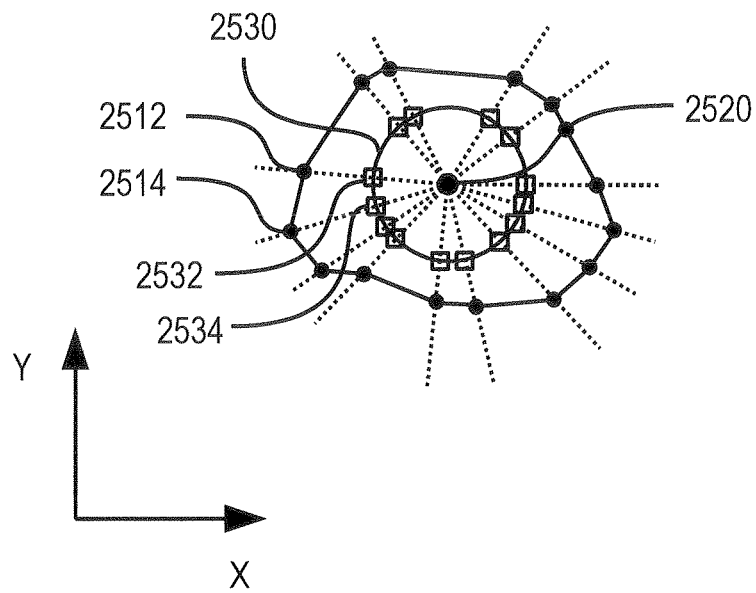

FIG. 25E shows a unit circle 2530 centered at the polygon center of mass 2520. A matrix [B] is composed of the list of polygon starting with points 2512, 2514 and including all points in the polygon. A second matrix [A] is composed of corresponding points on the unit circle 2532, 2534, etc. A 3×3 linear transform [M] is found that represents the least squared fit between points [M][B] and [A]:

$$M = AB(B^TB)^{-1}$$

Figure 25F:
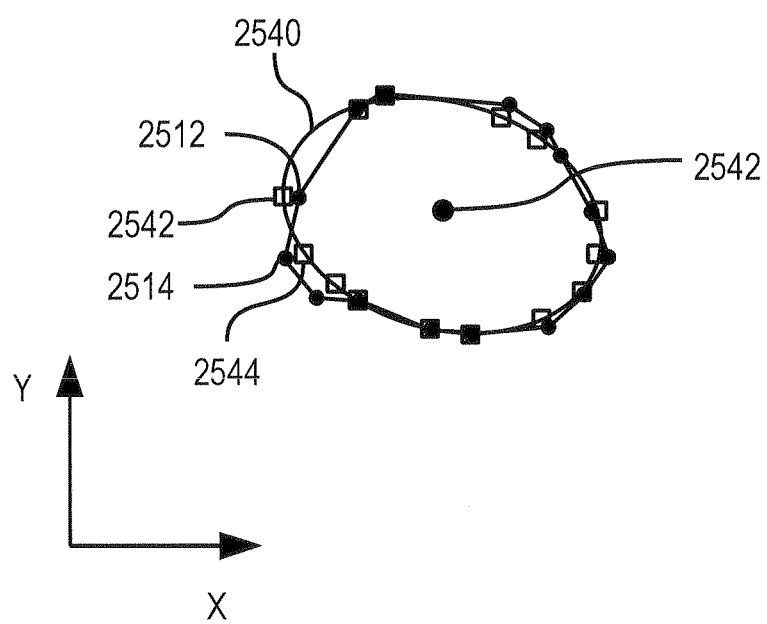

FIG. 25F shows the ellipse 2540 resulting from the transform M applied to a unit circle. The origin 2542 of [M] is the center of the ellipse, and is near in proximity, but different from the polygon center of mass. Points of the polygon such as 2512, 2514 are transformed by $M^{-1}$ and their closest points on the unit circle (centered at origin) generate a new matrix [A]. Through iteration of the above least squares fit method, matrix [M] is refined to produce the least squares fit matrix. Typically, convergence occurs within 4 or 5 iterations.

The best fit ellipse can be determined directly from the matrix [M]. The center of the ellipse is the origin of matrix [M]. A 3×3 matrix has more degrees of freedom than an ellipse, and may possess a skew between axes. Thus, in order to determine the semi-major and semi-minor axes of the ellipse, eigenvectors and eigenvalues are extracted from [M]. The largest eigenvalue is multiplied by its corresponding unit length eigenvector to produce the ellipse semi-major axis. The smaller eigenvalue is the length of the ellipse semi-minor axis, which is normal to the semi-major axis.

Target Tracking

If targets are tracked in successive images, the information of their last known location can be used to reduce the search times for targets in following frames.

If using a threshold based ellipse detection, there are two considerations for searching. First, which part of the screen to search, and second, at what intensity level to contour the image. The intensity level to contour a target is ideally the intensity that produces extracted ellipses with the foreground to background area ratio that matches that of the target model. The further the intensity threshold deviates from this intensity, the less likely the target's ellipses will be detected.

Having detected a target previously, it is possible to measure what intensity level will contour a target at the optimal area ratio. By projecting the target in its estimated pose into image coordinates, it is possible to sample points along the perimeter of the projected background circle. The perimeter, being on the edge between light and dark areas will be blurred and average at the halfway intensity between the detected light and dark intensities of the target.

In the case that no target was detected in the previous frame, choosing a random intensity threshold is a reasonable strategy. The intensity randomly jumps until it finds the target, then locks on to the target intensity so that in successive frames the intensity level will adjust to changing target lighting or exposure levels.

Searching for ellipses can also be optimized based on appearance of last screen position. Targets are most likely to be near where they appeared in the prior frame. Thus, contouring and searching for ellipses can search the local area surrounding the last sighting first, and if the target it detected it does not need to search the entire screen.

Details on Boundary Shift Compensation

After performing ellipse (or other shape) detection, a tree of containment for all detected shapes is created. Shapes containing other shapes are called "multi-part shapes." For all multi-part shapes, it is possible to calculate a foreground to background area ratio, which is simply the sum of the area of all foreground figures divided by the area of the background figure.

When we wish to compare a detected multi-part shape to a target model, it is necessary to first adjust the boundaries of multi-part shape to match the area ratio of the model shape. If we make the assumption that the boundary shift we are observing is consistent in pixel distance towards high or low intensity throughout the entire target figure, then we can calculate the degree of shift, or offset, necessary to restore the multi-part shape to any given area ratio. In particular, we can restore our detected multi-part shapes to the area ratio(s) of the model shapes we wish to match them to.

Using ellipses as figures allows this to be done simply, as we can approximate an offset shape for every ellipse by adjusting the magnitude of the ellipses semi-major and semi-minor axes. Determining the amount to lengthen or shorten those axes in order to achieve a given area ratio can be solved directly with a quadratic equation.

To be considered for matching against a known target, a multi-part shape first must be adjusted to the area ratio of that target. This ratio (R) is defined as the total area of the foreground figures ($A_f$) divided by area of the background figure ($A_b$):

$$R = \frac{A_f}{A_b} \text{ or } R \cdot A_b = A_f$$

FIG. 26 illustrates a simple multi-part shape consisting of a background figure 2602 and a foreground figure 2632. The background figure ellipse has major and minor semi axis length of $P_b$ 2604 and $q_b$ 2606 respectively. The foreground figure has major and minor semi axis lengths of $p_f$ 2634 and $q_f$ 2636.

The shape offset a distance of delta from this ellipse can be approximated by the ellipse with a major semi-axis length of $p_b$+delta and minor semi-axis of $q_b$+delta. The area of this offset shape of the expanded background figure 2610 is:

$$A_b = \pi(P_b + \Delta^2)(q_b + \Delta^2)$$

The area of the n foreground figures can be expressed in a similar fashion. As these figures have an intensity polarity opposite of that of the background, they will shrink in size by the corresponding delta offset. An example is ellipse 2640, whose semi axes have been reduced in magnitude by distance delta. In general, there are several foreground figures, and their areas can be expressed via summation:

$$A_f = \pi \sum_{i=1}^{n}(p_i - \Delta)(q_i - \Delta)$$

Combining this with our original ratio formula and removing the common $\pi$:

$$R \cdot (p_b + \Delta)(q_b + \Delta) = \sum_{i=1}^{n}(p_i - \Delta)(q_i - \Delta)$$

Expanding and moving to all terms to one side, we have:

$$R \cdot (p_b q_b + p_b \Delta + q_b \Delta + \Delta^2) - \sum_{i=1}^{n}[p_i q_i - p_i \Delta - q_i \Delta + \Delta^2] = 0$$

We can solve directly for delta putting this into standard quadratic form:

$$A\Delta^2 + B\Delta + C = 0, \text{ where}$$

$$A = R - n,$$

$$B = R(p_b + q_b) + \sum_{i=1}^{n}(p_i + q_i), \text{ and}$$

$$C = R p_b q_b - \sum_{i=1}^{n} p_i q_i$$

The quadratic yields two solutions. The solution delta that added to the semi axes lengths yields only positive values is then selected. A positive value of delta grows the background shape outward, and shrinks the foreground figures. A negative value of delta shrinks the background shape and grows the foreground figures. All figure centers remain unchanged, their axes are simply adjusted in length by the value delta.

Overcoming Disadvantages of the Prior Art

Some advantages of some embodiments follow. Note that the following list is intended to be merely exemplary and not exhaustive of all of the advantages in all or some of the embodiments.

The target pattern can be affixed to, or projected onto, any flat surface. The targets can be printed inexpensively on ink jet or laser printers, or directly onto labels or packaging.

Detection of the targets is simplified because the figures always lie within the projected background shape. The background shape provides the keys to transform the shape back into the 2-D space in which the target was modeled.

Every geometric feature is used both to identify the target and also to precisely locate an identified point within the image. Thus, each target produces multiple accurate 2-D positions (from the background shape and foreground figures), and one can derive a full attitude pose (six degrees of freedom) from these multiple positions. This compactness is an advantage over prior art.

When represented by a small number of pixels, the distorting effects of boundary shift prevent prior art targets from being detected or properly located. By measuring and compensating for boundary shift, the described system is able to detect and properly identify and locate targets distorted by boundary shift.

A large number of target designs are obtainable by randomly generating packings of random figures. This differs from prior methods which rely on sectioning off the image around the high accuracy location into radial zones and sectors, and turning these image sections on and off in a binary pattern to communicate identity.

While some prior art requires multiple targets to obtain a 3-D pose, the described system can extract pose from a single image of one target. A measure of accuracy for the pose can be derived from the reprojection error of the target.

Embodiments of the described system that utilize ellipses as figures have several advantages over prior art. Ellipses are not cast out of shape by projection, and project to ellipses in almost any lens model. This is not true of most other shapes; for example, a straight line projected through a fish-eye lens will appear as a curve.

As with circles, the centers of projected ellipses can be accurately found by fitting an ellipse to its perimeter, even if the boundary has shifted (by exposure, etc) towards black or white and the size of the detected ellipse changes, the center remains accurately fixed. Ellipses are ideal targets because their boundaries are continuous (have no sharp corners) so they are not degraded as badly by blurring as shapes with sharp corners. Also, ellipse centers can be found precisely as all pixels along the perimeter contribute to finding the center of the ellipse.

Because of these and other features of the target and detection system, these targets can be detected when occupying few pixels of the image, when viewed at extreme angles, and when the image is degraded by blurring, compression, or demosaicing. The target delivers multiple high accuracy identified locations, which allows a single target to convey the distance to the target, the 3-D plane of the target, and a 3-D camera pose of the target. Targets can be used in conjunction to gain wider coverage, and more accuracy than attainable with the use of traditional single location targets.

Example Applications

Some applications of some embodiments follow. Note that the following list is intended to be merely exemplary and not exhaustive of all of the possible applications in all or some of the embodiments.

Camera Calibration

Although a lens projection model can map the projection of a particular optics system consistently, every camera device has individual manufacturing differences that must be measured and accounted for as parameters in the lens model. Take for example the principle point location of the image—a misalignment between a CCD sensor and lens optical axis comprising only a small fraction of a millimeter can account for a principal point offset of several pixels in resulting images.

To yield accurate positioning data, a camera device must be calibrated to derive proper lens parameters. To accomplish such calibration, a number of physical locations [A], having known and accurate 3-D coordinates, are recorded in images by the camera device. The corresponding observed projections [A'] of those locations are identified. Then by utilizing a minimizing nonlinear solver we can find the parameters (p) that best map the observed projection:

$$\text{Minimize} |\text{Proj}([A], \vec{p}) - [A']|^2$$

The residual is the measure of reprojection error:

$$\vec{r} = \text{Proj}([A], \vec{p}) - [A']$$

and its norm is a measure of accuracy of reprojection.

Note that the camera's extrinsic parameters (position and orientation relative to the 3-D coordinate grid) need not be known, as they can be derived as part of the same minimization method. The minimizing solution must then include six additional parameters for position and rotation.

In FIG. 27 an application user 2702 performs a calibration of a camera equipped mobile device 2704. The user prints a calibration sheet 2710 on card stock paper and affixes it to an evenly lit flat surface. The application prompts the user to point the device at the calibration sheet and to hold the camera still so that the camera can record the image. Once the device has determined that the camera is still (by either the image not changing or by using an accelerometer sensor), the camera grabs a frame of video and searches for the calibration sheet 2710 in the image. Instructing the user to repeat this action at several angles, the application collects a set of images to be used for finding lens parameters.

The calibration sheet 2710 contains an amoeba target 2712 at its center. The remainder of the page is covered with circular dots 2714 placed in a random pattern. The target is used both to identify the calibration sheet, and to locate the randomly placed dots. As the camera is not yet calibrated, we cannot trust the reprojection residual of the target to indicate which of the two likely poses is correct. Thus, both poses are evaluated to see if they are consistent with the rest of the calibration sheet. The 2-D field of dots is located in 3-D with each pose and the projected (with a best guess as to lens parameters) into image coordinates. If either of the poses produce a number of reprojected points that coincide in proximity with observed dots, then those dots are identified and used to further refine the pose. If, after refinement of pose and lens parameters, more dots are identified by proximity, then these dots are used to refine poses and lens parameters. The norm of the residual is evaluated to ensure that the calibration is accurate.

Once a camera's lens model and parameters are known, the camera can be used as an accurate photogrammetric device. Low cost lenses can produce measurements as accurate as their high cost counterparts, so long as projection is properly modeled and calibrated.

Fiducial Data Encoding

In FIG. 28, the described system is used as a locating mechanism within a fiducial marker. The fiducial marker 2800 incorporates an identified target 2802 at its center and an array of rectangular data cells 2812 outside of the target's safety region 2814. The detection of the target indicates that a fiducial is present. The target identification is used to indicate which fiducial coding system is being used and the printed scale of the fiducial marker. The 3-D pose of the target can be used to determine precisely where data cell locations project to in the image.

FIG. 29 illustrates another sample design for a fiducial marker using the described system. The marker 2900 incorporates an identified target 2902 as well as high precision satellite dots 2904, 2906, 2908, 2910. In this example, the target indicates a coding scheme for data with either high or low intensity in 96 rectangular cells 2912. The cells are positioned outside of the target's safety ring 2914, and also outside of each satellite dot's safety ring 2916. The encoding scheme, as indicated by the target identification, can be mapped as 96 locations to be sampled in a 2-D model space.

The four satellite dots are not strictly necessary but serve several practical purposes. In cases of ambiguous orientation, the satellite points can be used to confirm the correct orientation and are used to precisely position the fiducial in 3-D space. By minimizing the reprojection error of these satellite points as well as the target figure points, we can achieve a highly accurate 3-D pose. The fiducial in this example is not appreciably larger than the target, but one could imagine a larger fiducial with more data cells. In such an instance, the corner satellite points could also be used to measure the curvature of a surface to which the label is affixed.

The preferred approach to determining the screen locations to sample for data bits is to use the obtained pose and lens projection model to determine the proper screen locations to sample. This is accomplished by first using the target pose to transform the data bit coordinates into 3-D camera space positions. Those positions are then projected through the lens model to determine the precise locations to sample in the raster image. The use of a generalized lens model and precise 3-D pose versus a 2-D grid means that highly distorted lenses do not present a problem in decoding the fiducial—so long as sufficient resolution exists to adequately sample the image.

Sampling at the locations can be done, for example, by thresholding. The raster image is interpolated to retrieve an intensity value for each of the projected cell locations and that value is compared to a given threshold value. Selection of the threshold value can be difficult, but the central amoeba target can indicate the best threshold value. Sampling the image at projected locations along the boundary of the background shape provides an intensity value that is halfway between the detected light and dark regions. This intensity value is then used as the thresholding value for evaluating binary data bit locations.

FIG. 30 shows how a fiducial 3000 using this encoding scheme might appear. The dashed line shows the boundary of the label, but is not necessary in the fiducial. No safety region outside of the dashed line is required.

Tapeless Tape Measure

FIG. 31 shows an application of the targets and detection technology in a mobile application. A user 3102 holds a mobile phone 3110 containing a camera 3112 and a display screen 3114. Not identified, but also present in the phone, are all typical parts of a computer such a central processing unit (CPU) and memory, e.g., flash memory.

The user places a target 3120 on a wall or other flat surface. He then activates the tape measure application program that grabs video frames from the camera, and searches for targets. As the user moves and points the phone at the target, the target's full attitude pose relative to the phone is computed, and the user can display several useful measurements, including but not limited to:

1. Distance between phone (camera lens) and target center.
2. Angle from phone to target surface.
3. Normal distance to plane of target surface.

Additionally, the user can outline a shape in the plane of the target to measure surface area.

The tape measure target is printed in a number of sizes, each size using a different target identification. For example, the one inch diameter, wallet-sized target uses a different identifying pattern than the seven inch diameter, clipboard-sized target. The scale, derived from the identification, is used to properly range distance to the target.

For a phone equipped with an accelerometer, the distance measurements can be separated into horizontal and vertical components. Such a utility is helpful if one wishes to know height above or below a given target, or slope relative to a ground plane. If the phone is equipped with a magnetic compass or other direction sensing capability the distance to target can be broken down into distance measures in north/south of target, east/west of target, and above/below target. In these cases, non-visual sensor data can be combined with the data gathered from captured camera images in order to present more meaningful information to the user.

The tape measure application uses the target tracking features (as described in the section on target tracking), to provide a real time frame rate with limited CPU power. Once a target is located in a frame of video from the camera, the following frame can first be searched in the local region screen near the last sighting.

The intensity at which to contour the image is tracked from frame to frame as well. A detected target has only a limited range of contour threshold values at which it is detected. Ideally, the image is contoured at an intensity value that produces figures having the same figure-to-background area ratio as the model shape. This ideal contour value is at the center of the intensity range that works to detect the target. As the user moves the phone around, the gain and light levels on targets are always changing. The threshold value is modified each frame to be at the center of the workable range from the previous frame, maximizing the likelihood that the target will be detectable in the new frame. In the event that a target was not detected in a previous frame, a random contour threshold is chosen each frame until a target is detected.

Augmented Reality Applied to Interior Design

FIG. 32 illustrates a user 3202 who wishes to see how an empty living space 3230 will look once furnished. A set of different targets are printed and assigned meanings, such as flower pot 3220, painting 3222, or window curtains 3224. The user places the targets 3232, 3234, 3236, 3238 on surfaces in the vacant room in order to indicate placement of virtual computer generated objects. For the drapes, two targets are used to indicate the size of the window to be dressed as well as its 3-D location. Lower left and upper right hand corners of the window are marked with paired targets.

The user starts an application on the mobile device 3210 that uses an embedded camera 3212 to grab images and a CPU to detect targets. The CPU detects and identifies targets and the 3-D pose of each target relative the camera is calculated. Computer generated 3-D models 3220, 3222, 3224 are rendered on top of the captured images, using the 3-D position and orientation derived from the targets.

As the user moves about the room they can view the mobile device screen 3214 and see the 3-D computer generated objects rendered on top of the background of the empty room. The application allows the user to save pictures or video of the space with virtual objects rendered on top of the captured images.

In this example, target identity is used to encode not only the size of the target, but also the intended virtual object to be rendered at its position. The orientation of the target placements in the room is also used to orient the virtual 3-D objects.

An alternative method of performing this augmenting application would be to create a local positioning system, as described in the previous construction site sample. In this case, objects are placed in the global coordinate system to which each target's position is stored. The user indicates where objects should be placed by dragging an icon to a screen location. A ray through that screen location is traced to the plane of the closest target, the point of intersection is the location the virtual object is placed. When viewed, the global position of the camera is calculated from visible targets and the virtual objects are drawn positioned relative to the global system.

Construction Site Local Positioning System

Precise satellite based GPS requires costly equipment, a system of retrieving real time correction data, and often many minutes of sampling time. Satellite based GPS also requires a clear view of the sky that is not available indoors, underground, or in dense urban sites.

To provide a fast, accurate, and low cost solution to positioning, a construction site has target markers placed throughout that are each surveyed with a precise method locating them in reference to a global positioning system. In addition to global position, the orientation of each target relative to a global reference system is also recorded into a computer database. The construction drawings have all been created in a computer aided design system that is able to relate all features relative to this global positioning system.

Construction workers carry a hand-held mobile device equipped with an embedded computer, display, and digital camera. A worker can measure precise global position and orientation by aiming the camera at one or more targets.

If one target is detected, the pose of the detected target effectively communicates the full 3-D pose of the sensing hand-held device relative to the global reference system. The targets are looked up in a database and their locations and orientations are used as landmarks to calculate the position of the hand-held device.

In one embodiment, this is accomplished by representing the target's pose with a 4×4 transformation matrix defined relative to a global coordinate system. A second 4×4 transformation matrix represents the pose of the hand-held device relative to the detected target. By concatenating the two matrices, one can readily determine the 3-D pose of the hand-held device relative to the global frame. This allows workers to precisely position items, and to orient them properly on three rotational axes with only one target in view.

In circumstances where more than one target is in view, there are several methods to determine a higher precision position and orientation of the hand-held device. In one embodiment, the pose ambiguity can be resolved completely by examining both primary and secondary poses for each detected target. The pose of each target relative to the global coordinate system is retrieved from the database and concatenated with the primary pose matrix of the hand-held device relative to the target, resulting in one candidate global pose matrix. The pose is also concatenated with the secondary pose matrix, resulting in a second candidate global pose matrix. This calculation is performed for each of the targets in view, and the entire set of global pose candidates is examined. As the correct global pose is represented by one of the two candidate poses from each target, one must simply examine the set of candidate poses to find the correct one that is common to all targets.

In another embodiment, the 3-D locations of the targets relative to the hand-held coordinate system are used to find a pose for the hand-held device to the global coordinate system. From any speculated pose of the hand-held device relative to the global coordinate system, one can concatenate the pose or poses of each target relative to the speculated pose, resulting in a 3-D position for each target (based on the speculated pose). A non-linear solver is employed to adjust all parameters of pose to minimize the norm of the difference between the resulting speculated 3-D position of each target and the global position of each target as recorded in the database. The pose of the hand-held device that minimizes this norm is the correct pose of the hand-held device.

In yet another embodiment, the pose of the hand-held can be determined by using the precise identified 2-D locations on each target. A 3-D position is determined for every figure of each of the targets on the site and stored in a database. This can be accomplished by transforming the figure locations relative to the target model by the 3-D target pose transformation. It can also be accomplished by a photogrammetric survey and bundle adjustment of the identified 2-D figures.

Each target in view is identified as well as each figure on each target. For any speculated pose, a reprojection error can be calculated as the norm of the difference between the observed 2-D image locations of the detected target and the 2-D image location obtained by transforming the 3-D location of the target figure from the database by the speculated pose transform. A non-linear minimizing solver is used to adjust all parameters of pose to minimize this reprojection error. The pose resulting in the lowest reprojection error is the correct pose. A measure of error can be made from value of the reprojection error, or a more in depth analysis of the residual.

Workers can also use the display of the hand-held device to overlay augmented reality layers on top of real time video. For example, to see where all the electrical wiring will be, a worker can enable that layer of the CAD drawings as a 3-D augmented display. The position and orientation of the hand-held device relative to the global frame is calculated based on targets in its camera's view, and that pose relative to the global system is used to render in 3-D all the electrical wires in a virtual view that overlays view captured by the camera.

Crime Scene/Accident Site Documentation

The site of a crime or auto accident is photographed from multiple viewpoints to preserve a permanent record of it. Targets are placed throughout the scene to serve as identifiable markers, to identify specific features (such as weapon, tire skid mark), to identify the scale of objects in the plane of the target, and to allow the 3-D position of the camera and objects in scene to be calculated.

Upon review, photos can be searched based on the targets recorded in them. Measurements can also be performed directly from any single photo containing a target. In one example, measurements can be made between objects in the plane of the target. If a user selects any two locations on the screen, those 2-D locations can each be converted into a 3-D ray by the lens projection model. Those skilled in the art will recognize that the plane of the target can readily be extracted from the pose matrix (for example, by using the z-axis and origin of the pose matrix). Both rays are intersected with the plane, resulting in two 3-D coordinates. The distance between these 3-D coordinates accurately represents the distance between the objects in the photograph, so long as the image locations selected correspond with 3-D points that lay in the plane of the target.

A similar approach can be used to determine surface area of complex shapes in the photograph; for example, to determine the surface area of a blood or liquid spill. One or more targets is placed on the ground in the plane of the spill and a photograph including both the spill and target. The user traces the shape of the spill on top of the recorded image. The traced path is represented as a 2-D polygon consisting of vertices. Each 2-D vertex is converted (via the lens model) to a 3-D ray and each ray is intersected with the plane of the target and transformed into the target's model coordinate system (with Z=0 for all points). Thus, a representation of the spill has been surveyed as a 2-D polygon in the plane of the target. Those skilled in the art will recognize that properties such as area, center of mass, or perimeter length can easily be derived from the 2-D polygon representation. All measurements must also factor in the scale of the target surveyed, which can be determined by looking up the target identification in a database for its printed scale.

Video Game Input Device

A video game console equipped with a camera detects targets that are placed on players as a way for the players to interact with the game. The targets are used as an input device that supplies the game with 3-D locations and orientation of each target.

A game can present an accurate 3-D perspective based on the position of the player's head. If the player wears a target on his head, the 3-D positions of each of the player's eyes can be recorded relative to the target. Each position can be used as the projection center for a stereo 3-D display, or the average of the eye positions can be used to generate a single projection center. The view on the display can be drawn as if the player is looking through an actual window into a virtual 3-D world.

Multiple viewers using LCD shutter glasses could each see a 3-D virtual world through the virtual display window as it responds to the changing position and tilt of their head. The display that includes a high refresh rate illuminates a view for one of the viewer's eyes. While shutting all other eye shutters, the shutter for one viewer's eye is opened. This allows light of the display that corresponds to the player's eye position into his eye for a small time slice. The display then shows the virtual world from the next eye's perspective, while shutting all eye shutters except its corresponding viewer eye. By time slicing the display and progressing eye by eye, all viewers perceive the virtual 3-D world from their unique point of view, as established by their head-worn targets.

Players can also place targets on their limbs, or on inanimate objects and use, those object positions as input to games. The addition of multiple players does not require additional hardware for this input, as a single camera can detect a large number of targets.

Various games can be played using the targets as an input device:

1. 3-D Twister: A video console game in which the television depicts a 3-D array of colored spheres. Each player has a target on the end of each of their limbs. Just like in the traditional game of Twister®, a color and a limb are chosen randomly and the players have to put their limb on the appropriate sphere that will correspond to the real space.

2. 3-D Dancing Game: Targets are placed on each players limbs, and players must move in the appropriate way in time with the music.
3. Bug Smash Game: Players have a target on their hand and move it in space that corresponds to a virtual space on the TV. Bugs randomly appear which must be smashed by the players' hands.

Ergo Monitor

Individuals with chronic ergonomic conditions could wear targets on their head, limbs, or clothing while using their computer. The computer's camera detects the user posture and motion, and reminds the user to use proper posture, maintain the proper screen viewing distance or angle, or use proper hand positioning, such as using the keyboard or mouse in a way that does not cause injury.

This can be accomplished by using, for instance, a computer's camera, or "web cam." The angle of the camera is determined to establish its pitch. A computer user wears a target on his head or chest and the computer monitor's his distance to screen, angle of his head, bend of his neck, and time in front of the computer. The computer informs the user when his posture or repetitive motion could cause injury, and tells him specifically what to do to correct it, or when to take a break.

In a similar setup, a camera could monitor potential mouse and keyboard problems. By positioning a camera in view of these manual devices, and by equipping each hand, wrist, or elbow with targets, the computer could monitor the patient's habitual use of these input devices and suggest how to avoid injury caused by use of these devices.

Automated Yoga Coach

A computer acts as a yoga coach. While guiding a student through a lesson, the student wears a workout suit covered with targets. The computer recognizes the targets, and can respond to the student with specific instructions on what and how to move in order to achieve a better yoga pose. The computer can track the flexibility, strength, and balance of the student from day to day and adjust the yoga regimen to achieve desired goals.

Targets on the student's body could also be used to analyze balance, motion, and to recognize specific injuries. Feedback for movement could be converted into audible tone frequency changes, allowing a student to perceive and fine tune her movements with her eyes closed.

Golf Caddy Application

Targets can be placed above the holes on a golf course. A caddy can use a mobile device to detect distance to the hole as well as any height difference and select the appropriate club for ranging to the hole.

Targets placed around the golf course can also facilitate determination of a precise position on the golf course. A number of targets placed around the course have precisely surveyed global positioning coordinates and altitude. A user can point a hand held device at one or more targets, and determine the precise location of his ball, which he does for each stroke of the game. Using that location as a key, a computer database can be indexed which displays all records of golfers who hit a ball from that location, using which club, and what the results of that stroke were.

Targets surveyed around the golf course would also allow televisors of events to perform measurements and determine precise positions from images of the event, or to facilitate the placement of augmented reality enhancements of the event.

Motion Capture

Targets can be placed on actors or stunt persons, and an action scene can be recorded with one or more cameras. The placement (or pose) of each camera is known relative to a single local coordinate system. The targets are located within the images to provide a motion tracks that animate a 3-D character with the same motion as the actor.

The targets convey a precise 3-D position as well as a full orientation of each surface to which they are attached. This information can be used to reduce the number of total targets required, or track complexly animating surfaces such as clothing. As targets are uniquely identified, the system does not lose tracking on a target if it becomes temporarily obscured.

Motion can be captured simultaneously for a large number of targets with no incremental hardware cost per additional target.

Cinematography Camera Focus System

Targets can be placed in frame to be detected by film or digital cameras equipped with a digital preview video output and computer controlled focus mechanism. The preview video is used to detect targets in the frame, and as the camera moves throughout a shot, the distance to each target is calculated.

The camera operator chooses a target to focus on, and the changing distance to the selected target is used to adjust the focus system to keep the target, and subject matter at the same distance, in focus as the camera moves through the scene. In order to change focus, the camera operator can choose select another target, in which the camera eases to that focus distance and continues to adjust the camera.

A similar focus system can be constructed without having targets in frame. A second video camera is attached to the cinematography camera, but this camera points off set where a number of surveyed targets are placed. As the main camera moves, the secondary camera uses its view of targets to compute its position in real time. The position can be used to determine focus to fixed point, and the motion path can be used for placement of computer generated objects in the scene.

Medical Patient Markers

Targets can be placed inside a patient, detectable either through cameras in arthroscopic surgery, or through an X-Ray or other non-surgical scan. Targets could be placed, for example, at various locations on a healing broken bone to monitor the bone's progress, or tattooed onto a radiation patient's skin in order to direct the radiation treatment.

Such targets could be used to establish a coordinate system for robotic surgery, or to record the 3-D movements of surgeon's tools for later analysis. The targets could be placed in the patient's body, and also on the backs of surgical instruments to guide the instruments or record a photogrammetric record of the operation.

Docking Navigation System

Targets could be placed on satellites, spacecraft, or space station parts. A computer monitoring video from various vantages of the spacecraft can detect targets to precisely dock spacecraft, grab satellites with a robotic arm, or to aid in the precise positioning of parts. The detected target poses could also be additional inputs to inertial navigation systems (for example, Kalman filter type multiple sensor systems). Targets could be self illuminating in visible or non-visible light, allowing for detection when not illuminated by the Sun.

Targets located on the ground could be used to determine precise position and orientation of spacecraft, or aircraft. These targets can be constructed to emit energy at spectra that are not interfered by cloud cover.

Buoy Tracking

In order to track and record ocean currents, a number of inexpensive buoys are dropped from an aircraft in an area of interest. Each buoy is equipped an identifiable target on its top side facing up. A satellite, or fleet of aircraft monitor the region and record digital images. The positions and orientations of each buoy is tracked to model the flow of currents. Rotation of the buoys could also be recorded and used to model turbulence. A key application would be the tracking of ocean currents surrounding an oil spill. Buoys could be deployed at an incident and used to track the slick over time.

These buoys could also be used to measure properties of other bodies of water, such as lakes and streams. Properties such as surface flow and turbulence could be extracted from a set of small buoys dropped and recorded with a video camera. The targets would supply a 3-D location and orientation per frame, from which many properties and visualizations can be derived.

Wind Sock

A target is placed on a hanging metal plate that is observed by a digital camera connected to a computer. As wind adjusts the plate, the computer measures the angle of the target and determines the wind speed and direction based on target position and orientation. A single camera can detect a field of multiple wind socks to inexpensively model the characteristics of the wind.

A large structure such as a tower or wind turbine could also be monitored for wind deflection and harmonic motion. Targets placed, for example, on the tips of wind turbine blades could be used to monitor the structure and to detect vibrations, or excessive deflection.

Checkout System

A warehouse store places targets on every box that it sells. The target identifies the boxed item, as well as the size and shape of the box. A camera equipped checkout computer can evaluate a stack of boxes to ensure that all boxes are visible, and that no box is hidden behind other boxes. If the computer detects that boxes may be hidden it notifies the customer or checkout clerk to adjust the boxes so that all items may be seen and scanned.

Such a system can also be used to track the movement of inventory (by surveillance or other cameras) through warehouses, or throughout a store. By tracking items' movements through the store, the store owner can also collect data on behavior patterns of its shoppers. For example, the store owner can determine the path of the shopper through the store and where and how long they stopped, as well as the order of items they put on their cart.

Kitchen Remodel

A construction contractor is hired by a customer to do a kitchen remodel. The contractor places targets on all surfaces of the kitchen. Each target has an identification that is associated with a particular surface for example, "Floor," "Counter-Top," "Cabinet Face," "Refrigerator Front," etc. The contractor then takes a number of photographs of the kitchen.

Back at the office, the contractor can index the photographs based on the targets detected in each. For example, he can display all images with the "counter top" target in view. Once an image and target is selected, the contractor can perform measurements in the plane of each target. Thus, if he forgot to obtain any measurement on the site, he can easily extract the needed measurement from a photograph without having to travel to the construction site or disturb the client. Measurements of surface area can be made directly by tracing the outline of the shape in the plane of the target, greatly simplifying work, and reducing errors.

Automated Assembly Line

A manufacturing plant has a conveyor belt carrying parts of different varieties and at random orientations. An automated work station consisting of a robotic arm, a video camera, and a computer allows the parts to be sorted and oriented for further processing.

Each part has printed on it a number of targets, such that at any given orientation at least one target is visible from any vantage point. The target identification is used not only to identify the part, but also to locate the part's pose. For each target, a database stores a corresponding part as well as the pose of the target relative to the part's coordinate system. Upon detection of a target, the part's pose can be reconstructed by referencing target pose relative to the part from the stored database. By concatenating the detected target's pose with the pose of the target relative to the part, the system can detect the pose of the part by identifying one target.

Upon recognizing the targets, the part is identified and its 3-D position and orientation are modeled. The robotic arm is driven to grab the part at one of its prescribed grab locations, to pick it up, and to place the part on the appropriate output conveyor belt at the orientation that best lends to the processing to follow. A similar work station could assemble parts based on the positioning information of target markings on the parts, or could precisely paint or weld parts by having detected the 3-D poses of all parts in the camera's view.

Self-Guided Museum Audio-Visual Tour

A museum exhibit places targets in exhibit cases, or works of art. An audio-visual tour, purchased from the museum as a mobile application program, is downloaded onto a mobile device such as a phone or PDA. Exhibit attendees may freely walk the exhibit at their own pace and take any path about the exhibit.

When the attendee aims his camera equipped mobile device at a display, the application program detects the targets on the display case or adjacent to the art. Detecting the specific art piece or display, the audio can be queued to the appropriate part of the tour. Other multi-media content such as video or web pages can be made available based on the context.

Where the audio tour points out specific features of the artwork, those features can be highlighted (for example with a virtual arrow) in the augmented reality display on the attendee's phone. Virtual 3-D objects can also be inserted into the scene to show, for example, how an ancient statue would have appeared when it was new.

Additionally, if the mobile application reports back to the museum on the items that the attendee scanned, that information can be used to track the popularity of exhibits, and specific items within those exhibits. Further, they would be able to track the route that viewers take through exhibits. If patrons use this program on multiple visits, the museum would be able to develop a profile for each user and suggest other exhibits that might be of interest to him/her based on that information and the data gathered from other patrons with correlating interests.

Non-Rigid Motion Control Rig

A motion control rig is used to drive a camera along a specific prescribed path for recording stop motion animation. In order to be precise, motion control rigs must be rigid, in order that stepper motors may accurately position and orient an armature. However, in this instance it would be advantageous for reasons of cost, weight, or practicality to construct a motion control rig using less rigid or flexible components, such as cables.

In addition to being equipped with the animation camera, the armature end-effector is also equipped with a positioning camera. A number of targets are placed on the set, either inside or out of the shot (for example, on the ceiling) and are surveyed to relate all transforms to a single local coordinate system for the set. The armature motors are manipulated by a controller algorithm that works in a feedback loop to drive the motors to position the end effector at its desired pose as determined by the detection of targets in the positioning camera's view. On reaching the desired position and orientation, a frame is recorded on the animation camera, and the rig advances to the positioning for the following frame.

UAV Landing Navigation System

An unmanned aerial vehicle must land by flying into a small net or hook a line very precisely. In order to drive an automated landing, targets are placed at predetermined locations on the hook line or net. A remote pilot or auto-pilot flies the vehicle to the landing site.

Upon detecting targets in view of the landing site, a landing is performed using the detected targets for precise positioning. Position and orientation derived from the targets can be used to drive the UAV actuators to the desired yaw, pitch, roll, position, and speed. Targets can be constructed of an infrared emitting material and detected with infrared cameras for discreet night time landing.

A person of reasonable skill in the art will recognize that they may make many changes to the details of the above-described embodiments without departing from the underlying principles.

The invention claimed is:

1. A target, comprising:
a background including a first intensity; and
a plurality of ovoid regions located on the background, wherein each of the plurality of ovoid regions includes a second intensity contrasting the first intensity;
wherein each of the plurality of ovoid regions is spaced at least a minimum distance from other of the plurality of ovoid regions;
wherein each of the plurality of ovoid regions includes a minor axis having at least the minimum distance;
wherein each of the plurality of ovoid regions is spaced at least the minimum distance from the outer edge of the background; and
wherein a width of a safety region substantially surrounding the background region is at least the minimum distance.

2. The target of claim 1 wherein the safety region includes the second intensity.

3. The target of claim 1 wherein at least two of the ovoid regions are of a different shape.

4. The target of claim 1 wherein the plurality of ovoid regions includes one or more elliptical regions.

5. The target of claim 1 wherein the plurality of ovoid regions is rotationally non-symmetric.

6. The target of claim 1 further comprising:
a medium having reproduced thereon the background and the plurality of ovoid regions; and
wherein the medium includes at least one of metal, paper, stencil mask, plastic, rubber, or laser inscribable medium.

7. The target of claim 1 wherein the medium, background, and the plurality of ovoid regions is capable of detection using a single sensing channel or multiple sensing channels.

8. The target of claim 1
wherein a placement or a shape of each of the plurality of ovoid regions is configured to uniquely define the target;
wherein the shape of each of the plurality of ovoid regions is one of a fixed set of shapes; and
wherein the fixed set of shapes corresponds to one or more shapes grouped according to predetermined areas.

9. The target of claim 1 wherein a placement, shape, or color of each of the plurality of ovoid regions is configured to encode digital information.

10. A non-transitory computer readable medium having computer-executable instructions stored thereon that, if executed by a processor, cause the processor to process image data captured from the target of claim 1 and discern therefrom at least one of a distance to the target, identification of the target, or pose of the target.

11. A method, comprising:
identifying a target including a background region having a first intensity and a plurality of ovoid regions having a second intensity contrasting the first intensity; and
calculating at least one of a distance to the target or a pose of the target responsive to identifying the target;
wherein each of the plurality of ovoid regions is spaced at least a minimum distance from other of the plurality of ovoid regions;
wherein each of the plurality of ovoid regions includes a minor axis having at least the minimum distance;
wherein each of the plurality of ovoid regions is spaced at least the minimum distance from the outer edge of the background; and
wherein a width of a safety region substantially surrounding the background region is at least the minimum distance.

12. The method of claim 11 wherein the identifying the target includes:
generating a plurality of contour loops substantially surrounding a boundary of each of the plurality of ovoid regions wherein the boundary of each of the ovoid regions crosses a predetermined intensity value; and
fitting each of the plurality of contour loops to a corresponding ellipse.

13. The method of claim 12 further comprising selecting the predetermined intensity value based on the boundary of each of the plurality of ovoid regions or a boundary of the background region.

14. The method of claim 11 further comprising:
determining an area of the background region;
calculating an area of the plurality of ovoid regions by summing an area corresponding to each of the plurality of ovoid regions; and
determining an area ratio of the target by dividing the area of the plurality of ovoid regions by the area of the background region.

15. The method of claim 14 further comprising correcting the area ratio of the target responsive to an area ratio of a model.

16. The method of claim 11 further comprising converting the background region and the plurality of ovoid regions to a model metric space that is rotationally invariant.

17. The method of claim 11 further comprising matching each of the plurality of ovoid regions to one or more shapes stored in a database.

18. The method of claim 17 wherein the matching includes:
extracting predetermined metrics from each of the plurality of ovoid regions; and
comparing the predetermined metrics to metrics associated with the one or more shapes stored in the database.

19. The method of claim 11 further comprising:
generating at least two potential poses for the target based at least in part on an orientation associated with each of the plurality of ovoid regions; and
ranking the at least two potential poses.

20. The method of claim 19 further comprising refining the at least two potential poses.

* * * * *